United States Patent
Hashimoto et al.

(10) Patent No.: US 8,003,243 B2
(45) Date of Patent: Aug. 23, 2011

(54) SPIRALLY WOUND SECONDARY BATTERY WITH UNEVEN TERMINATION END PORTIONS

(75) Inventors: Fumiko Hashimoto, Fukushima (JP); Yuzuru Fukushima, Miyagi (JP); Hiroyuki Suzuki, Fukushima (JP)

(73) Assignee: Sony Corporation, Tokyo (JP)

( * ) Notice: Subject to any disclaimer, the term of this patent is extended or adjusted under 35 U.S.C. 154(b) by 405 days.

(21) Appl. No.: 11/268,033

(22) Filed: Nov. 7, 2005

(65) Prior Publication Data
US 2006/0115736 A1 Jun. 1, 2006

(30) Foreign Application Priority Data

Nov. 8, 2004 (JP) ................. P2004-323997
Nov. 8, 2004 (JP) ................. P2004-323998
Nov. 8, 2004 (JP) ................. P2004-324002

(51) Int. Cl.
*H01M 2/14* (2006.01)
*H01M 4/583* (2010.01)
*H01M 10/0587* (2010.01)

(52) U.S. Cl. ........ 429/94; 429/246; 429/126; 429/231.8
(58) Field of Classification Search ............ 429/94, 429/122, 209, 246
See application file for complete search history.

(56) References Cited

U.S. PATENT DOCUMENTS

| | | |
|---|---|---|
| 4,950,566 A | 8/1990 | Huggins et al. |
| 5,395,711 A | 3/1995 | Tahara et al. |
| 5,506,075 A | 4/1996 | Iwasaki et al. |
| 6,203,944 B1 * | 3/2001 | Turner et al. ............. 429/218.1 |
| 6,869,723 B2 | 3/2005 | Yamaguchi |
| 2002/0004161 A1 | 1/2002 | Yamaguchi |
| 2002/0004171 A1 * | 1/2002 | Kimijima et al. ............. 429/246 |
| 2002/0015889 A1 * | 2/2002 | Yamamoto et al. ......... 429/231.95 |
| 2003/0211390 A1 * | 11/2003 | Dahn et al. ................. 429/218.1 |
| 2004/0062982 A1 * | 4/2004 | Takezawa et al. ............ 429/130 |

(Continued)

FOREIGN PATENT DOCUMENTS
JP 06-325765 11/1994
(Continued)

OTHER PUBLICATIONS

D. Larcher et al., "In Situ X-Ray Study of the Electrochemical Reaction of Li with n'-$Cu_6Sn_5$," Journal of The Electrochemical Society, 2000, vol. 147, No. 5, pp. 1658-1662.

*Primary Examiner* — Keith Walker
(74) *Attorney, Agent, or Firm* — K&L Gates LLP

(57) ABSTRACT

A secondary battery capable of improving charge-discharge cycle characteristics in the case where an alloy material is used as an anode active material is provided. An exposed cathode region is disposed in an outer end portion of a cathode. The exposed cathode region includes an insulating protective member on at least one of an outer side and an inner side of the exposed cathode region in a position opposed to an outer end portion of an anode active material layer in one turn inside the outer end portion. In a cathode active material layer, a central angle between an outer end portion and a central end portion at the center of the spirally wound body is preferably within a range from 0° to −90° inclusive from the central end portion in a winding direction.

6 Claims, 20 Drawing Sheets

U.S. PATENT DOCUMENTS

| | | | |
|---|---|---|---|
| 2004/0096733 A1* | 5/2004 | Shibamoto et al. | 429/94 |
| 2005/0208378 A1* | 9/2005 | Mizutani et al. | 429/231.95 |

FOREIGN PATENT DOCUMENTS

| | | |
|---|---|---|
| JP | 07-230800 | 8/1995 |
| JP | 07-288130 | 10/1995 |
| JP | 08-315825 | 11/1996 |
| JP | 11-260415 | 9/1999 |
| JP | 2000311681 A * | 11/2000 |
| JP | 2001-006724 | 1/2001 |
| JP | 2001-143701 | 5/2001 |
| JP | 2001-143761 | 5/2001 |
| JP | 2001-266946 | 9/2001 |
| JP | 2004-03217 | 1/2004 |
| JP | 2004-087324 | 3/2004 |
| JP | 2004-127541 | 4/2004 |
| JP | 2004-164867 | 6/2004 |
| JP | 2004/087324 A * | 11/2004 |
| JP | 2004-311272 | 11/2004 |
| JP | 2004-311331 | 11/2004 |
| WO | WO 02/078113 A1 * | 10/2002 |
| WO | WO 2004/100293 A1 * | 11/2004 |

* cited by examiner

SPIRALLY WOUND SECONDARY BATTERY WITH UNEVEN TERMINATION END PORTIONS

CROSS REFERENCES TO RELATED APPLICATIONS

The present application claims priority to Japanese Patent Application JP 2004-323997 filed in the Japanese Patent Office on Nov. 8, 2004, Japanese Patent Application JP 2004-324002 filed in the Japanese Patent Office on Nov. 8, 2004, and Japanese Patent Application JP 2004-323998 filed in the Japanese Patent Office on Nov. 8, 2004, the entire contents of which being incorporated herein by reference.

BACKGROUND

The present invention relates to a secondary battery including a spirally wound body formed through laminating a cathode and an anode with an electrolyte in between, and spirally winding the cathode and the anode, and more specifically to a secondary battery including an anode which includes an anode active material being capable of inserting and extracting an electrode reactant and including at least one kind selected from the group consisting of metal elements and metalloid elements as an element.

In recent years, a large number of portable electronic devices such as camcorders, cellular phones and laptop computers have been emerged, and an attempt to reduce the size and the weight of them has been made. Research and development aimed at improving the energy densities of batteries used as portable power sources of the electronic devices, specifically secondary batteries as a key device have been actively promoted. Among the batteries, a nonaqueous electrolyte secondary battery (for example, a lithium-ion secondary battery) can obtain a high energy density, compared to a lead-acid battery and a nickel cadmium battery which are aqueous electrolyte secondary batteries in related arts, so the improvement of the nonaqueous electrolyte secondary battery has been studied in all quarters.

As an anode active material used in the lithium-ion secondary battery, a carbon material having a relatively high capacity and superior cycle characteristics such as non-graphitizable carbon or graphite is broadly used. However, in consideration of a recent demand for a higher capacity, a further increase in the capacity of the carbon material presents a challenge.

In such a background, a technique of achieving a higher capacity by the use of a carbon material through selecting a material to be carbonized and forming conditions has been developed (for example, refer to Japanese Unexamined Patent Application Publication No. H8-315825). However, when such a carbon material is used, an anode has a discharge potential of 0.8 V to 1.0 V relative to lithium, and when a battery includes the carbon material, the discharge voltage of the battery is reduced, so a significant improvement in the energy density of the battery can be hardly expected. Moreover, there is a disadvantage that hysteresis in the shape of a charge-discharge curve is large, thereby energy efficiency in each charge-discharge cycle is low.

On the other hand, as an anode with a higher capacity than the carbon material, an alloy material which is formed through electrochemically alloying some kind of metal with lithium and has a property of being reversibly produced and decomposed has been researched. For example, an anode with a high capacity using a Li—Al alloy has been developed, and an anode with a high capacity including a Si alloy has been developed (for example, refer to U.S. Pat. No. 4,950,566). Moreover, an intermetallic compound $Cu_6Sn_5$ has been developed (for example, refer to D. Larcher "Journal of The Electrochemical Society" 2000, Vol. 5, No. 147, p. 1658-1662).

However, a Li—Al alloy, a Si alloy or $Cu_6Sn_5$ has a big disadvantage that the cycle characteristics are extremely poor, because the alloy expands or shrinks according to charge and discharge, so every time a charge-discharge cycle is repeated, the anode is pulverized.

Therefore, as a technique for improving the cycle characteristics, a technique of substituting an element not involved in expansion and shrinkage according to insertion and extraction of lithium for a part of the alloy has been considered. For example, $LiSi_sO_t$ ($0 \leq s$, $0<t<2$), $Li_uSi_{1-v}M_vO_w$ (where M is a metal element except for alkali metal or a metalloid element except for silicon; $0 \leq u$; $0<v<1$; and $0<w<2$), or a LiAgTe-based alloy has been proposed (for example, refer to Japanese Unexamined Patent Application Publication Nos. H6-325765, H7-230800 and H7-288130). However, the fact is that even if these anode active materials are used, a decline in charge-discharge cycle characteristics due to expansion and shrinkage is large, so it is difficult to take advantage of a high capacity.

Moreover, in the case where these anode active materials are used, an anode largely expands or shrinks according to charge and discharge. Therefore, specifically in the case where a spirally wound laminate including a cathode and an anode with an electrolyte in between is used, a step formed by an end portion of an active material layer on an outer side of the spirally wound laminate or a lead presses the separator by the expansion of the anode, thereby the anode comes into contact with the other electrode to develop a very small short circuit, and the short circuit causes a decline in charge-discharge cycle characteristics. Moreover, abrasion of an end portion of an active material layer and paint splatters during formation cause a step on the surface of the cathode or the anode, thereby a very small short circuit may occur in a like manner to cause a decline in the charge-discharge cycle characteristics. Such a phenomenon occurs specifically under high temperature conditions or during a charge-discharge cycle in a state of overcharge.

In a winding type battery using a carbon material as an anode active material in a related art, a technique of adhering an insulating material such as a tape made of polyimide or polypropylene to an end portion of a first electrode and a second electrode facing the end portion of the first electrode in order to prevent a short circuit between the electrodes which may occur in the case where an external pressure is applied to the battery has been proposed (for example, refer to Japanese Unexamined Patent Application Publication No. 2001-266946).

Another factor causing a decline in the charge-discharge cycle characteristics is low roundness of a spirally wound body. When the roundness of the spirally wound body is low, and the distortion of the spirally wound body is large, a pressure is not uniformly applied to an electrode. The separator in a position where a high pressure is applied is pressed, thereby a very small short circuit may occur. On the other hand, in a position where a low pressure is applied, a gap between electrodes expands, thereby the deposition of lithium may occur to cause a serious decline in load characteristics or the charge-discharge cycle characteristics. Further, in the case where the spirally wound body is put into a relatively soft battery can, the battery may be deformed by an pressure from inside caused by the expansion of the anode.

In a related art, in order to improve the roundness, a technique of arranging a cathode lead and an anode lead such that the cathode lead and the anode lead form a central angle of approximately 120° or 240° at the center of the spirally wound body has been proposed (for example, refer to Japanese Unexamined Patent Application Publication No. 2004-87324); however, a further improvement in the roundness is desired.

Moreover, there is a disadvantage that the deterioration of an electrode occurs during a charge-discharge cycle by repeats of the expansion and shrinkage of an anode active material, and accordingly the electrode may be broken during the use of the battery to cause an interruption of use or a short circuit. In particular, in the case where a spirally wound laminate including a cathode and an anode with an electrolyte in between is used, when steps formed by an end portion of an active material layer or a lead gather in one point because of a structural reason, that is, a small diameter of the spirally wound laminate on a center side, the shape of the spirally wound laminate is largely distorted, thereby the possibility that the electrode is broken due to the deterioration of the electrode is increased. This issue is serious specifically in a high load charge-discharge cycle or a charge-discharge cycle in a state of overcharge.

In a winding type battery using a carbon material as an anode active material proposed in a related art, the cathode is disposed at an outermost position of a spirally wound body, and an outermost end portion of an anode current collector is protruded from an outermost end portion of a cathode current collector toward the front, and an anode lead is attached to the protruded portion of the anode current collector, thereby the unevenness of the outermost portion of the spirally wound body can be eliminated, and a short circuit between the anode lead and the outermost end portion of the cathode current collector can be prevented (for example, refer to Japanese Unexamined Patent Application Publication No. H11-260415).

SUMMARY

In view of the foregoing, it is desirable to provide a secondary battery capable of improving charge-discharge cycle characteristics in the case where an alloy material is used as an anode active material.

According to an embodiment of the present invention, there is provided a secondary battery including: a spirally wound body formed through laminating a cathode which includes a cathode active material layer on a strip-shaped cathode current collector and an anode which includes an anode active material layer on a strip-shaped anode current collector with a separator in between, and spirally winding the cathode and the anode, wherein the anode includes an anode active material which is capable of inserting and extracting an electrode reactant, and includes at least one kind selected from the group consisting of metal elements and metalloid elements as an element, the cathode includes an exposed cathode region in an outer end portion of the cathode, the exposed cathode region in which the cathode current collector is not covered with the cathode active material layer and is exposed, and the exposed cathode region includes an insulating protective member on at least one of an outer side and an inner side of the exposed cathode region in a position opposed to an outer end portion of the anode active material layer in one turn inside the outer end portion.

In the secondary battery according to the embodiment of the invention, the anode includes an anode active material which is capable of inserting and extracting an electrode reactant and includes at least one kind selected from the group consisting of metal elements and metalloid elements as an element, so a high capacity can be obtained. Moreover, the cathode includes an exposed cathode region in an outer end portion, and the exposed cathode region includes an insulating protective member on at least one of an outer side and an inner side of the exposed cathode region in a position opposed to an outer end portion of the anode active material layer in one turn inside the outer end portion, so a very small short circuit between a step formed by the outer end portion of the anode active material layer and the exposed cathode region can be prevented by the protective member disposed on the outer side, and in the case where a very small short circuit occurs, generated heat can be released to an outer side by the protective member disposed on the inner side. Therefore, while maintaining a high capacity, cycle characteristics and safety can be improved.

Moreover, when the anode includes an exposed anode region to which an anode lead is connected, and the exposed anode region extends to a position opposed to a position where the anode lead is connected in one turn inside the position, even in the case where the anode expands according to charge and discharge, thereby a corner of the anode lead breaks through the exposed anode region or the separator, the contact between the anode lead and the exposed cathode region can be prevented, and a very small short circuit can be prevented.

Further, when the protective member is formed so as to have a width which is 0.5 mm to 5 mm larger than the width of the cathode current collector, even in the case where the width of the cathode extends according to charge and discharge, an end portion in a width direction of the cathode can be covered with the protective member so as to prevent a very small short circuit with the anode. Therefore, the cycle characteristics can be further improved.

When a central angle between an outer end portion and a central end portion in the cathode active material layer at the center of the spirally wound body is within a range from 0° to −90° inclusive from the central end portion in a winding direction, the roundness of the spirally wound body can be enhanced, and a pressure between the cathode and the anode in the spirally wound body can be equalized. Thereby, a very small short circuit due to compression of the separator can be prevented, and a decline in load characteristics or charge-discharge cycle characteristics due to deposition of lithium can be prevented. Therefore, while maintaining a high capacity, the cycle characteristics can be improved. Moreover, as the roundness is enhanced to equalize a pressure in the spirally wound body, a chemical reaction uniformly occurs, thereby reliability can be improved.

Further, when a central angle between a central end portion of an outer cathode active material layer and a central end portion of an inner cathode active material layer at the center of the spirally wound body is 72° or more, and the cathode lead is disposed so as to avoid a region from a central angle of 30° from the central end portion of the inner cathode active material layer in a winding direction R to a central angle of 30° from the central end portion of the inner cathode active material layer in a direction opposite to the winding direction at the center of the spirally wound body 20, a distortion in winding shape on a center side can be reduced, and a break due to deterioration of an electrode can be prevented. Therefore, while maintaining a high capacity, the cycle characteristics can be improved.

Additional features and advantages are described herein, and will be apparent from, the following Detailed Description and the figures.

DETAILED DESCRIPTION

Figure 1:
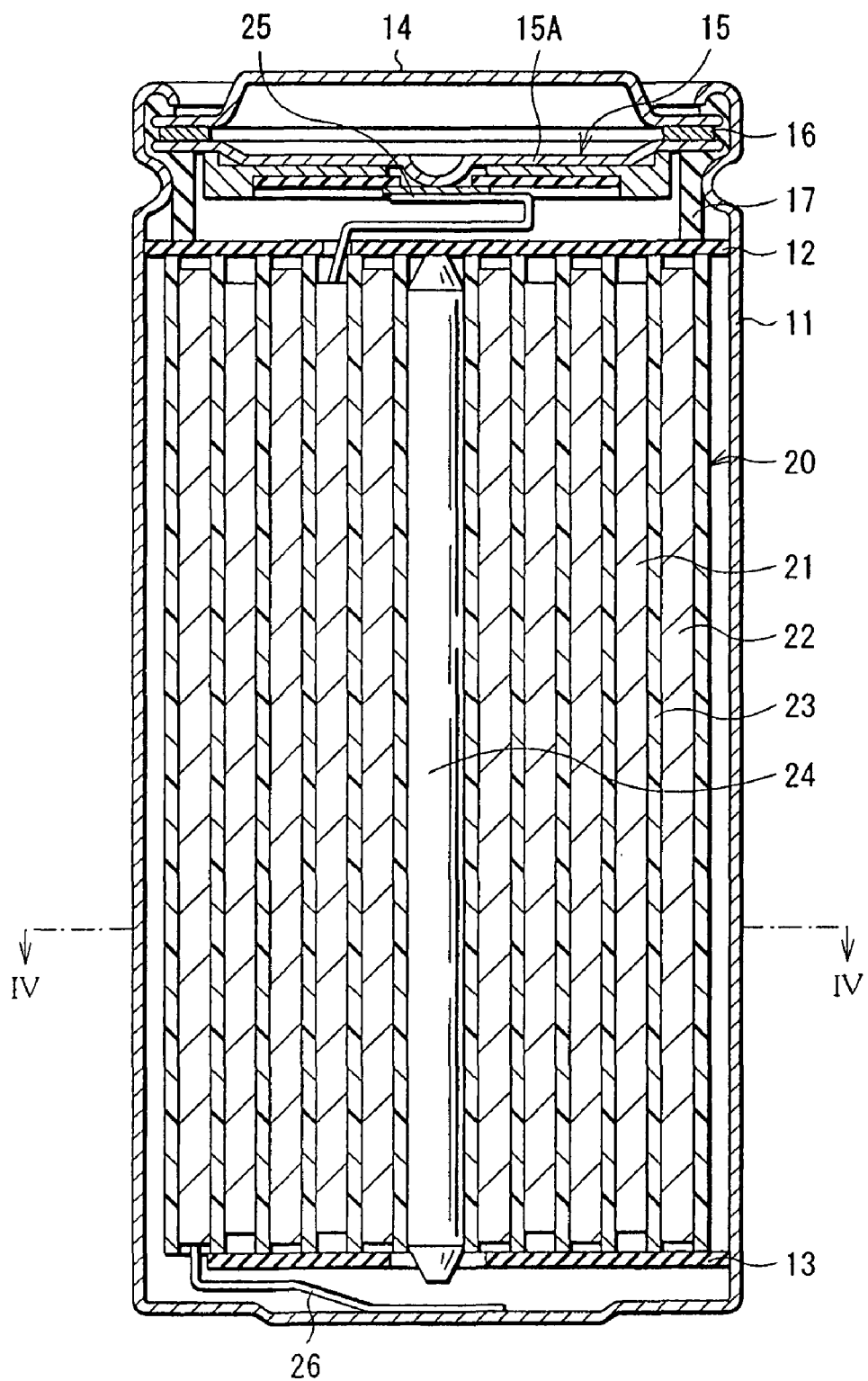
FIG. 1 is a sectional view of a secondary battery according to an embodiment of the invention.

Preferred embodiments of the invention will be described in detail below without limitation and referring to the accompanying drawings. In the drawings, the shape, the size and the arrangement of each component are briefly shown so as to understand the invention, and they are different from actual dimensions.

FIRST EMBODIMENT

FIG. 1 shows a sectional view of a secondary battery according to a first embodiment of the invention. The secondary battery is a so-called cylindrical type battery, and includes a spirally wound body 20 in a substantially hollow cylindrical-shaped battery can 11. The battery can 11 is made of, for example, nickel (Ni)-plated iron (Fe). An end portion of the battery can 11 is closed, and the other end portion thereof is opened. In the battery can 11, a pair of insulating plates 12 and 13 are disposed such that the spirally wound body 20 is sandwiched therebetween in a direction perpendicular to a peripheral winding surface.

In the opened end portion of the battery can 11, a battery cover 14 and, a safety valve mechanism 15 and a positive temperature coefficient device (PTC device) 16 disposed inside the battery cover 14 are mounted through caulking by a gasket 17, and the interior of the battery can 11 is sealed. The battery cover 14 is made of, for example, the same material as that of the battery can 11. The safety valve mechanism 15 is electrically connected to the battery cover 14 through the PTC device 16, and when an internal pressure in the battery increases to higher than a certain extent due to an internal short circuit or external application of heat, a disk plate 15A is flipped so as to disconnect the electrical connection between the battery cover 14 and the spirally wound body 20. When a temperature rises, the PTC device 16 limits a current by an increased resistance to prevent abnormal heat generation by a large current. The gasket 17 is made of, for example, an insulating material, and its surface is coated with asphalt.

The spirally wound body 20 is formed through laminating a cathode 21 and an anode 22 with a separator 23 in between and spirally winding them, and a center pin 24 is inserted into the center of the spirally wound body 20. A cathode lead 25 made of aluminum (Al) or the like is connected to the cathode 21 of the spirally wound body 20, and an anode lead 26 made of nickel or the like is connected to the anode 22. The cathode lead 25 is welded to the safety valve mechanism 15 so as to be electrically connected to the battery cover 14, and the anode lead 26 is welded and electrically connected to the battery can 11.

Figure 2:
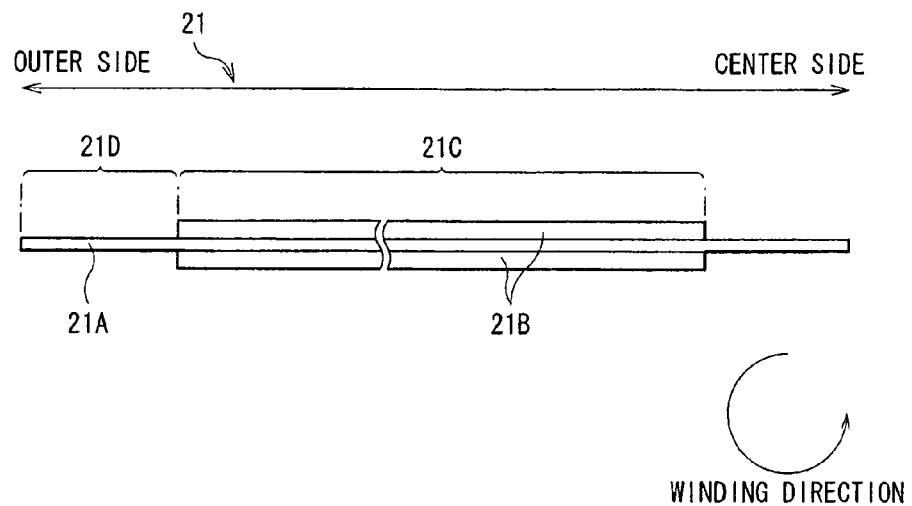
FIG. 2 is a sectional view of a cathode shown in FIG. 1 before winding.

FIG. 2 shows a sectional view of the cathode 21 shown in FIG. 1 before winding. The cathode 21 has, for example, a structure in which a cathode active material layer 21B is disposed on both sides of a cathode current collector 21A having a pair of facing surfaces. More specifically, the cathode 21 has a coated cathode region 21C in which the cathode active material layer 21B is formed on an outer surface and an inner surface of the cathode current collector 21A. In addition, in the cathode 21, an outer end portion is an exposed cathode region 21D, that is, a region in which the cathode active material layer 21B is not formed on both sides of the cathode current collector 21A, and both sides of the cathode current collector 21A are exposed.

The cathode current collector 21A is made of, for example, metal foil such as aluminum foil, nickel foil or stainless foil with a thickness of approximately 5 μm to 50 μm.

As a cathode active material, the cathode active material layer 21B includes, for example, one kind or two or more kinds of cathode materials capable of inserting and extracting lithium as an electrode reactant, and may include an electrical conductor such as a carbon material and a binder such as polyvinylidene fluoride, if necessary. Examples of the cathode material capable of inserting and extracting lithium include metal sulfides, metal selenides and metal oxides which include no lithium such as titanium sulfide ($TiS_2$), molybdenum sulfide ($MOS_2$), niobium selenide ($NbSe_2$) and vanadium oxide ($V_2O_5$), and lithium-containing compounds.

Among them, the lithium-containing compounds are preferable, because some lithium-containing compounds can obtain a high voltage and a high energy density. Examples of such lithium-containing compounds include a complex oxide including lithium and a transition metal element and a phosphate compound including lithium and a transition metal element, and in particular, a lithium-containing compound including at least one kind selected from the group consisting of cobalt (Co), nickel and manganese (Mn) is preferable, because a higher voltage can be obtained. For example, the compound is represented by a chemical formula $Li_xMIO_2$ and $Li_yMIIPO_4$. In the formulas, MI and MII represent one or more kinds of transition metal elements. In the formulas, the values of x and y depend upon a charge-discharge state of the battery, and are generally within a range of $0.05 \leq x \leq 1.10$ and $0.05 \leq y \leq 1.10$, respectively.

Specific examples of the complex oxide including lithium and a transition metal element include lithium-cobalt complex oxide ($Li_xCoO_2$), lithium-nickel complex oxide ($Li_xNiO_2$), lithium-nickel-cobalt complex oxide ($Li_xNi_{1-z}Co_zO_2$ ($z<1$)), lithium-manganese complex oxide ($LiMn_2O_4$) having a spinel structure and the like. Among them, a complex oxide including nickel is preferable, because a higher capacity can be obtained, and superior cycle characteristics can be obtained. Specific examples of the phosphate compound including lithium and a transition metal element include lithium-iron phosphate compound ($LiFePO_4$) and a lithium-iron-manganese phosphate compound ($LiFe_{1-v}Mn_vPO_4$ ($V<1$)).

Figure 3:
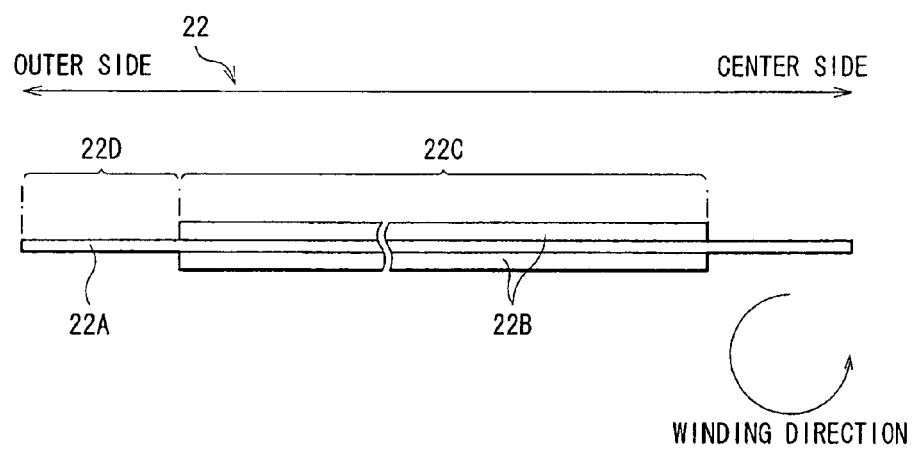
FIG. 3 is a sectional view of an anode shown in FIG. 1 before winding.

FIG. 3 shows a sectional view of the anode 22 shown in FIG. 1 before winding. The anode 22 has, for example, a structure in which an anode active material layer 22B is disposed on both sides of an anode current collector 22A having a pair of facing surfaces. More specifically, the anode 22 includes a coated anode region 22C in which the anode active material layer 22B is formed on an outer surface and an inner surface of the anode current collector 22A and an exposed anode region 22D in which the anode active material layer 22B is not formed on both sides of the anode current collector 22A, and both sides of the anode current collector 22A are exposed. An anode lead 26 is connected to the exposed anode region 22D.

The anode current collector 22A is made of, for example, metal foil such as copper foil, nickel foil or stainless foil. The anode current collector 22A has a thickness of, for example, 5 μm to 50 μm.

As an anode active material, the anode active material layer 22B includes an anode material which is capable of inserting and extracting lithium as an electrode reactant and includes at least one kind selected from the group consisting of metal elements and metalloid elements as an element. It is because when such an anode material is used, a high energy density can be obtained. The anode material may be made of the simple substance, an alloy or a compound of a metal element or a metalloid element, and a phase of one kind or two or more kinds selected from them may be included at least in a part of the anode material. In the embodiment of the invention, the alloy includes an alloy including one or more kinds of metal elements and one or more kinds of metalloid elements in addition to an alloy including two or more kinds of metal elements. Further, the alloy may also include a non-metal element. As the texture of the alloy, a solid solution, a eutectic (eutectic mixture), an intermetallic compound or the coexistence of two or more kinds selected from them is cited. One kind or a mixture of two or more kinds selected from the anode materials may be used.

Examples of the metal elements or the metalloid elements included in the anode material include metal elements or metalloid elements capable of forming an alloy with lithium. More specifically, magnesium (Mg), boron (B), aluminum (Al), gallium (Ga), indium (In), silicon, germanium (Ge), tin, lead (Pb), bismuth (Bi), cadmium (Cd), silver (Ag), zinc (Zn), hafnium (Hf), zirconium (Zr), yttrium (Y), palladium (Pd), platinum (Pt) or the like is included.

Among them, as the anode material, an anode material including a Group 14 metal element or a Group 14 metalloid element in the long form of the periodic table of the elements is preferable, and an anode material including at least one of silicon and tin is more preferable, because silicon and tin have a large capability to insert and extract lithium, so a high energy density can be obtained. More specifically, a material including a simple substance, an alloy or a compound of silicon or a simple substance, an alloy or compound of tin, or a material including a phase of one kind or two or more kinds of them at least in part is cited.

As a tin alloy, for example, an alloy including at least one kind selected from the group consisting of silicon, nickel, copper, iron (Fe), cobalt (Co), manganese (Mn), zinc (Zn), indium (In), silver (Ag), titanium (Ti), germanium (Ge), bismuth (Bi), antimony (Sb) and chromium (Cr) as a second element except for tin is cited. As a silicon alloy, for example, an alloy including at least one kind selected from the group consisting of tin, nickel, copper, iron, cobalt, manganese, zinc, indium, silver, titanium, germanium, bismuth, antimony and chromium as a second element except for silicon is cited.

As a tin compound or a silicon compound, for example, a tin compound or a silicon compound including oxygen (O) or carbon (C) is cited, and in addition to tin or silicon, the above-described second element may be included in the tin compound or the silicon compound.

Among them, as the anode material, a CoSnC-containing material in which tin, cobalt and carbon are included as elements, and the carbon content is within a range from 9.9 wt % to 29.7 wt % inclusive, and the ratio of cobalt to the total of tin and cobalt is within a range from 30 wt % to 70 wt % inclusive is preferable, because a high energy density and superior cycle characteristics can be obtained within such ranges.

The CoSnC-containing material may include any other element if necessary. As the element, for example, silicon, iron, nickel, chromium, indium, niobium (Nb), germanium, titanium, molybdenum (Mo), aluminum (Al), phosphorus (P), gallium (Ga) or bismuth is preferable, and two or more kinds of them may be included. It is because the capacity and the cycle characteristics can be further improved.

The CoSnC-containing material includes a phase including tin, cobalt and carbon, and the phase preferably has a low crystalline structure or an amorphous structure. Moreover, in the CoSnC-containing material, at least a part of carbon as an element is preferably bonded to a metal element or a metalloid element as another element. It is considered that a decline in the cycle characteristics results from cohesion or crystallization of tin or the like, and when carbon is bonded to another element, such cohesion or crystallization can be prevented.

As a measuring method for checking the bonding state of an element, for example, X-ray photoelectron spectroscopy (XPS) is used. In the XPS, the peak of the 1s orbit (C1s) of carbon in the case of graphite is observed at 284.5 eV in an apparatus in which energy calibration is performed so that the peak of the 4f orbit (Au4f) of a gold atom is observed at 84.0 eV. On the other hand, in the case where the charge density of the carbon element increases, for example, in the case where carbon is bonded to a metal element or a metalloid element, the peak of C1s is observed in a region lower than 284.5 eV. In other words, in the case where the peak of the composite wave of C1s obtained in the CoSnC-containing material is observed in a region lower than 284.5 eV, at least a part of carbon included in the CoSnC-containing material is bonded to the metal element or the metalloid element which is another element.

Moreover, in the XPS measurement, for example, the peak of C1s is used to correct the energy axis of a spectrum. In general, surface contamination carbon exists on a material surface, so the peak of C1s of the surface contamination carbon is fixed at 284.8 eV, and the peak is used as an energy reference. In the XPS measurement, the waveform of the peak of C1s is obtained as a form including the peak of the surface contamination carbon and the peak of carbon in the CoSnC-containing material, so the peak of the surface contamination carbon and the peak of the carbon in the CoSnC-containing material are separated through analyzing the waveform through the use of, for example, commercially available software. In the analysis of the waveform, the position of a main peak existing on a lowest binding energy side is used as an energy reference (284.8 eV).

The anode active material layer 22B may further include any other anode active material, and may include another material which does not contribute to charge such as a binder, an electrical conductor or a viscosity controller. As the other anode active material, for example, a carbon material such as natural graphite, artificial graphite, non-graphitizable carbon or graphitizable carbon is cited. As the electrical conductor, graphite fiber, metal fiber, metal powder or the like is cited. As the binder, a fluorine-based high molecular weight compound such as polyvinylidene fluoride, or synthetic rubber such as styrene butadiene rubber, ethylene propylene diene rubber or the like is cited. As the viscosity controller, carboxymethyl cellulose or the like is cited.

The separator 23 shown in FIG. 1 is made of, for example, a porous film of a polyolefin-based material such as polypropylene or polyethylene, or a porous film of an inorganic material such as nonwoven fabric of ceramic, and the separator 23 may have a structure in which two or more kinds of the porous films are laminated.

The separator 23 is impregnated with an electrolyte solution which is a liquid electrolyte. The electrolyte solution includes, for example, a solvent and a lithium salt as an electrolyte salt. The solvent dissolves and dissociates the electrolyte salt. As the solvent, propylene carbonate, ethylene carbonate, diethyl carbonate, dimethyl carbonate, 1,2-dimethoxyethane, 1,2-diethoxyethane, γ-butyrolactone, tetrahydrofuran, 2-methyltetrahydrofuran, 1,3-dioxolane, 4-methyl-1,3-dioxolane, diethyl ether, sulfolane, methylsulfolane, acetonitrile, propionitrile, anisole, acetate, butyrate, propionate or the like is cited, and one kind or a mixture of two or more kinds selected from them may be used.

As the lithium salt, $LiClO_4$, $LiAsF_6$, $LiPF_6$, $LiBF_4$, $LiB(C_6H_5)_4$, $CH_3SO_3Li$, $CF_3SO_3Li$, $LiCl$ or $LiBr$ is cited, and one kind or a mixture of two or more kinds selected from them may be used.

Figure 4:
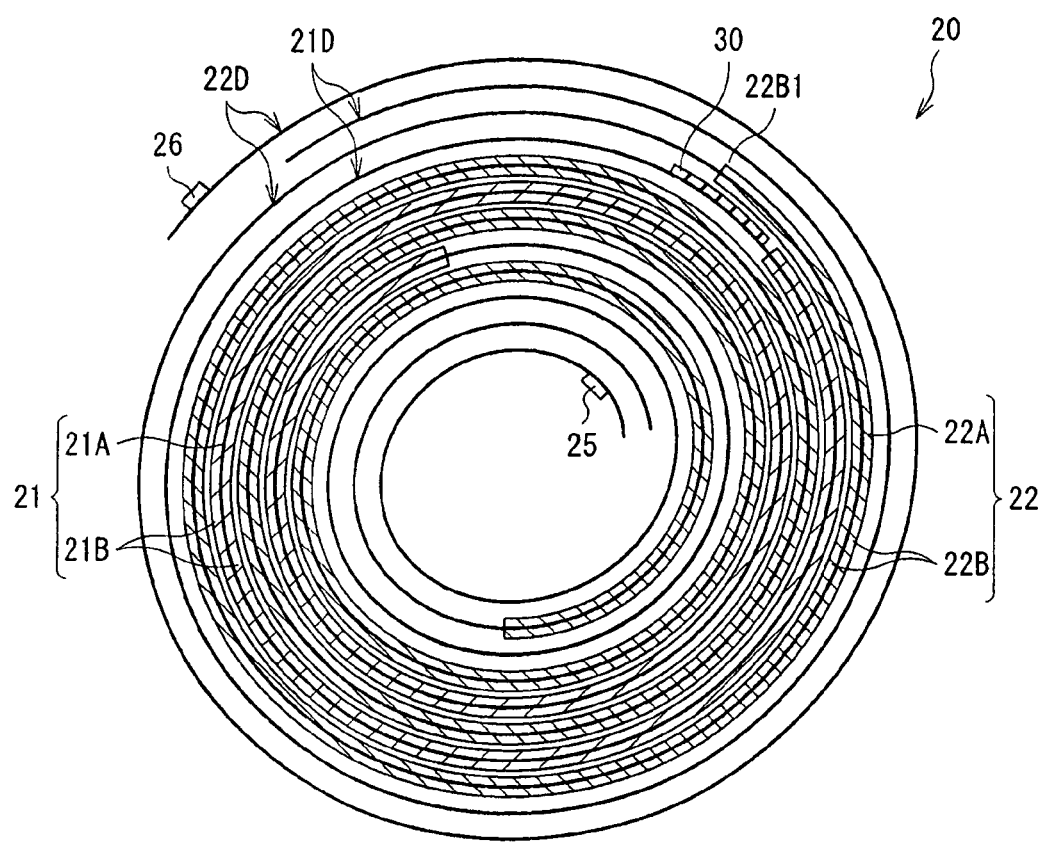
FIG. 4 is a sectional view of a spirally wound body taken along a line IV-IV line of FIG. 1.

FIG. 4 shows a sectional view of the spirally wound body 20 taken along a line IV-IV of FIG. 1. In FIG. 4, the separator 23 is not shown. The exposed cathode region 21D includes an insulating protective member 30 on an outer side of the exposed cathode region 21D in a position opposed to an outer end portion 22B1 of the anode active material layer 22B in one turn inside the outer end portion 22B1. Thereby, in the secondary battery, a very small short circuit between a step formed by the outer end portion 22B1 of the anode active material layer 22B and the exposed cathode region 21D can be prevented so the cycle characteristics can be improved.

The protective member 30 is preferably formed so as to have a width which is 0.5 mm to 5 mm larger than the width of the cathode current collector 21A. It is because in the case where the width of the cathode 21 extends according to charge and discharge, an end portion in a width direction of the cathode 21 which easily comes into contact with the anode 22 can be protected by the protective member 30, thereby a very small short circuit can be prevented.

As the protective member 30, any member which can stably exist can be used, and for example, an adhesive tape made of polypropylene or polyethylene terephthalate is cited.

Figure 5:
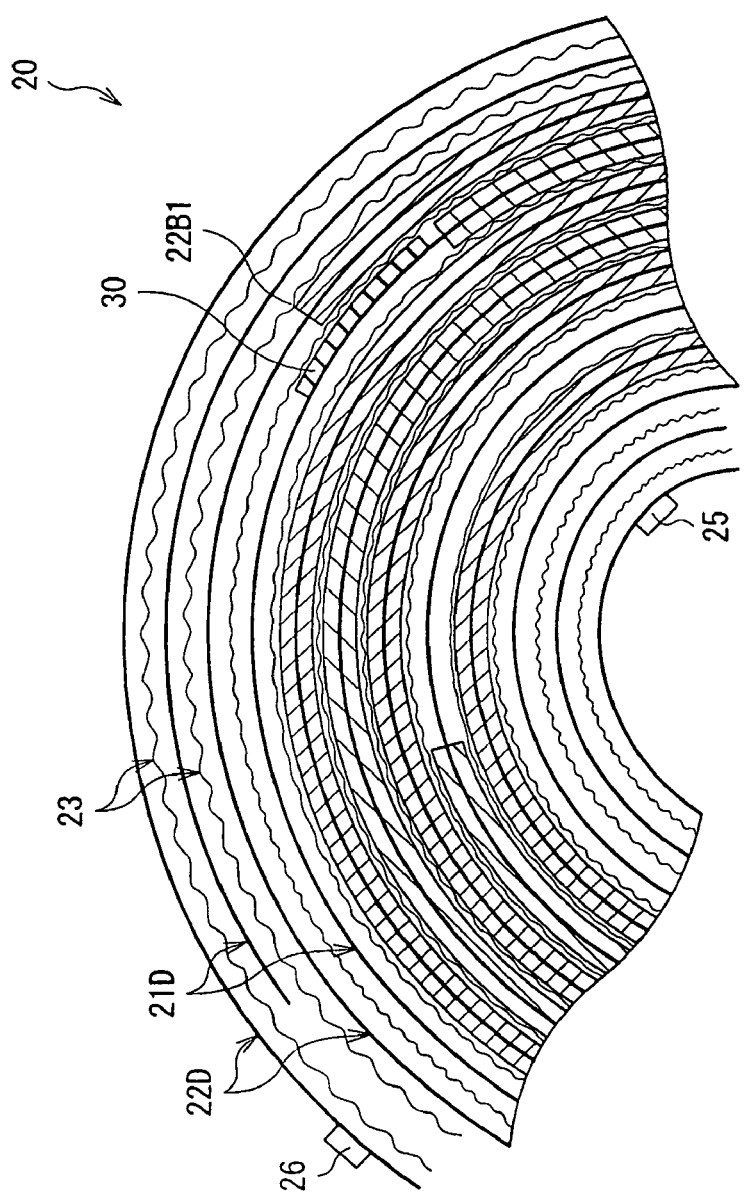
FIG. 5 is an enlarged sectional view of a part of the spirally wound body shown in FIG. 4.

Moreover, the anode lead 26 is connected to an outermost portion of the exposed anode region 22D as described above. Further, as shown in FIG. 5, the exposed anode region 22D extends to a position opposed to a position where the anode lead 26 is connected in one turn inside the position. Thus, in the case where the anode 22 expands according to charge and discharge, and a corner of the anode lead 26 breaks through the exposed anode region 22D or the separator 23, the contact between the anode lead 26 and the exposed cathode region 21D can be prevented, thereby a very small short circuit can be prevented. In FIG. 5, the separator 23 is shown with a wavy line.

The secondary battery can be manufactured through the following steps, for example.

At first, for example, a cathode active material, an electrical conductor and a binder are mixed to from a cathode mixture, and the cathode mixture is dispersed in a solvent such as N-methyl-2-pyrrolidone to form a paste-form cathode mixture slurry. Next, after the cathode mixture slurry is uniformly applied to the cathode current collector 21A through the use of a doctor blade, a bar coater or the like, and the solvent is dried, the cathode active material layer 21B is formed through compression molding by a roller press or the like so as to form the cathode 21. At this time, the exposed cathode region 21D is formed in an outer end portion of the cathode 21.

Moreover, as shown in FIG. 4, an adhesive tape made of the above-described material as the protective member 30 is disposed on an outer side of the exposed cathode region 21D in a position opposed to the outer end portion 22B1 of the anode active material layer 22B in one turn inside the outer end portion. At this time, the cathode current collector 21A is preferably formed so as to have a width which is 0.5 mm to 5 mm larger than the width of the cathode current collector 21A. In consideration of displacement of winding in the case where the spirally wound body 20 is formed, the length of the protective member 30 is preferably determined such that the protective member 30 is opposed to the outer end portion 22B1 of the anode active material layer 22B.

Next, for example, an anode active material and a binder are mixed to form an anode mixture, and the anode mixture is dispersed in a solvent such as N-methyl-2-pyrrolidone to form paste-form anode mixture slurry. Next, after the anode mixture slurry is uniformly applied to the anode current collector 22A through the use of a doctor blade, bar coater or the like, and the solvent is dried, the anode active material layer 22B is formed through compression molding by a roller press or the like so as to form the anode 22. The roller press may be heated to be used. Moreover, compression molding may be performed several times until a target physical property is obtained. Further, any pressing machine other than the roller press may be used.

Next, the cathode lead 25 is attached to the cathode current collector 21A by welding, and the anode lead 26 is attached to the anode current collector 22A by welding. After that, the cathode 21 and the anode 22 are laminated with the separator 23 in between, and the cathode 21 and the anode 22 are spirally wound several times in a winding direction shown in FIGS. 2 and 3 to form the spirally wound body 20.

After the spirally wound body 20 is formed, the spirally wound body 20 is sandwiched between a pair of insulating plates 12 and 13, and the anode lead 26 is welded to the battery can 11, and the cathode lead 25 is welded to the safety valve mechanism 15. Then, the spirally wound body 20 is contained in the battery can 11, and an electrolyte solution is injected into the battery can 11 to impregnate the separator 23 with the electrolyte solution. After that, the battery cover 14, the safety valve mechanism 15 and the PTC device 16 are fixed in an opened end portion of the battery can 11 through caulking by the gasket 17. Thereby, the secondary battery shown in FIG. 1 is completed.

When the secondary battery is charged, lithium ions are extracted from the cathode 21, and are inserted into the anode 22 through the electrolyte solution with which the separator 23 is impregnated. When the secondary battery is discharged, the lithium ions are extracted from the anode 22 and are inserted into the cathode 21 through the electrolyte solution with which the separator 23 is impregnated. In this case, the insulating protective member 30 is disposed on an outer side of the exposed cathode region 21D in a position opposed to the outer end portion 22B1 of the anode active material layer 22B in one turn inside the outer end portion 22B1, so a step formed by the outer end portion 22B1 of the anode active material layer 22B can be prevented from pressing the separator 23 by the expansion of the anode 22 and directly coming into contact with the exposed cathode region 21D. Therefore, a very small short circuit can be prevented, and the cycle characteristics can be improved.

Thus, according to the embodiment, the anode 22 includes the anode active material being capable of inserting and extracting an electrode reactant and including at least one kind selected from the group consisting of metal elements and metalloid elements as an element, so a high capacity can be obtained. Moreover, a very short circuit between the step formed by the end portion 22B1 of the anode active material layer 22B and the exposed cathode region 21D can be prevented by the insulating protective member 30. Therefore, while maintaining a high capacity, the cycle characteristics can be improved.

Moreover, when the anode 22 includes the exposed anode region 22D to which the anode lead 26 is connected in an outer end portion of the anode 22, and the exposed anode region 22D extends to a position opposed to a position where the anode lead 26 is connected in one turn inside the position, even in the case where the anode 22 expands according to charge and discharge, and an corner of the anode lead 26 breaks through the exposed anode region 22D or the separator 23, the contact between the anode lead 26 and the exposed cathode region 21D can be prevented, thereby a very small short circuit can be prevented.

Further, when the protective member 30 is formed so as to have a width which is 0.5 mm to 5 mm larger than the width of the cathode current collector 21A, even in the case where the width of the cathode 21 extends according to charge and discharge, an end portion in a width direction of the cathode 21 is covered with the protective member 30, thereby a very small short circuit with the anode 22 can be prevented. Therefore, the cycle characteristics can be improved.

SECOND EMBODIMENT

Figure 6:
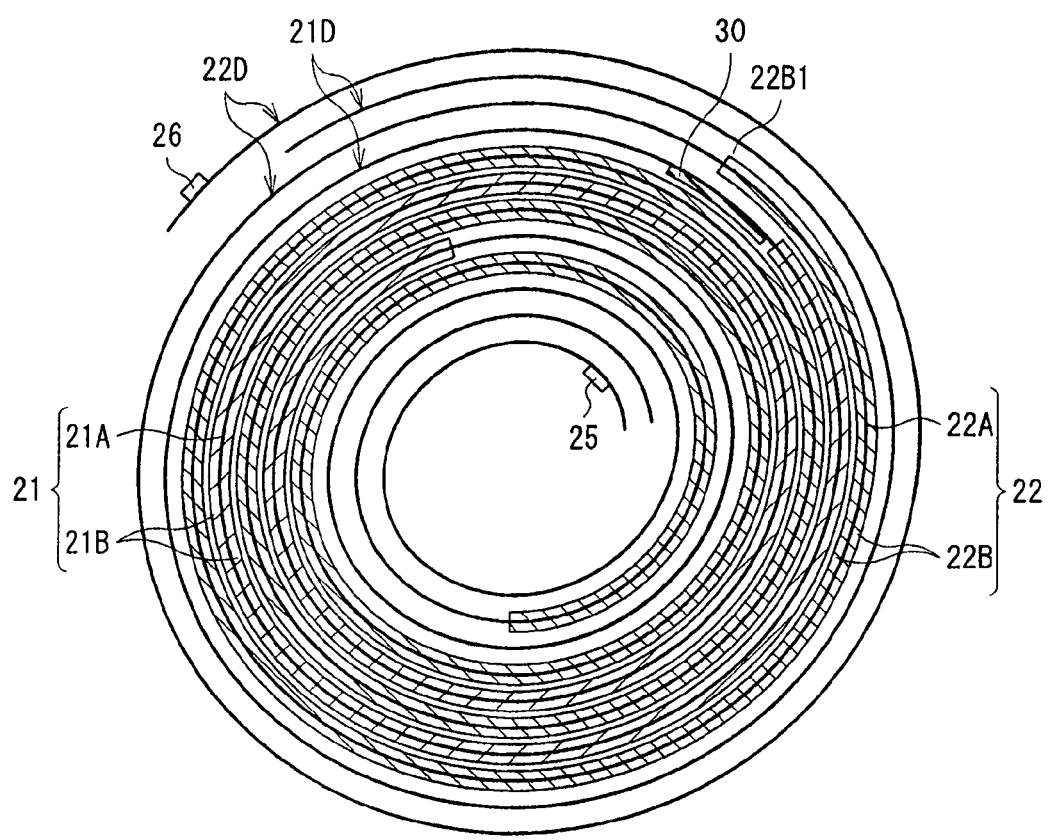
FIG. 6 is a sectional view of a spirally wound body according to a second embodiment of the invention.

FIG. 6 shows a sectional view of the spirally wound body 20 according to a second embodiment of the invention. The spirally wound body 20 has the same structure as that in the first embodiment, except that the exposed cathode region 21D includes the insulating protective member 30 on an inner side of the exposed cathode region 21D in a position opposed to the outer end portion 22B1 of the anode active material layer 22B in one turn inside the outer end portion 22B1, and the spirally wound body 20 can be formed in the same manner. Therefore, like components are denoted by like numerals as of the first embodiment. In FIG. 6, the separator 23 is not shown.

In the embodiment, as described above, the exposed cathode region 21D includes the insulating protective member 30 on an inner side of the exposed cathode region 21D in a position opposed to the outer end portion 22B1 of the anode active material layer 22B in one turn inside the outer end portion 22B1. Therefore, in the secondary battery, in the case where a very small short circuit between the step formed by the outer end portion 22B1 of the anode active material layer 22B and the exposed cathode region 21D occurs, generated heat is blocked by the protective member 30, so the heat does not reach a center side of the spirally wound body 20, and is released to an outer side of the spirally wound body 20. Therefore, an excessive increase in temperature can be prevented, and safety can be improved.

THIRD EMBODIMENT

Figure 7:
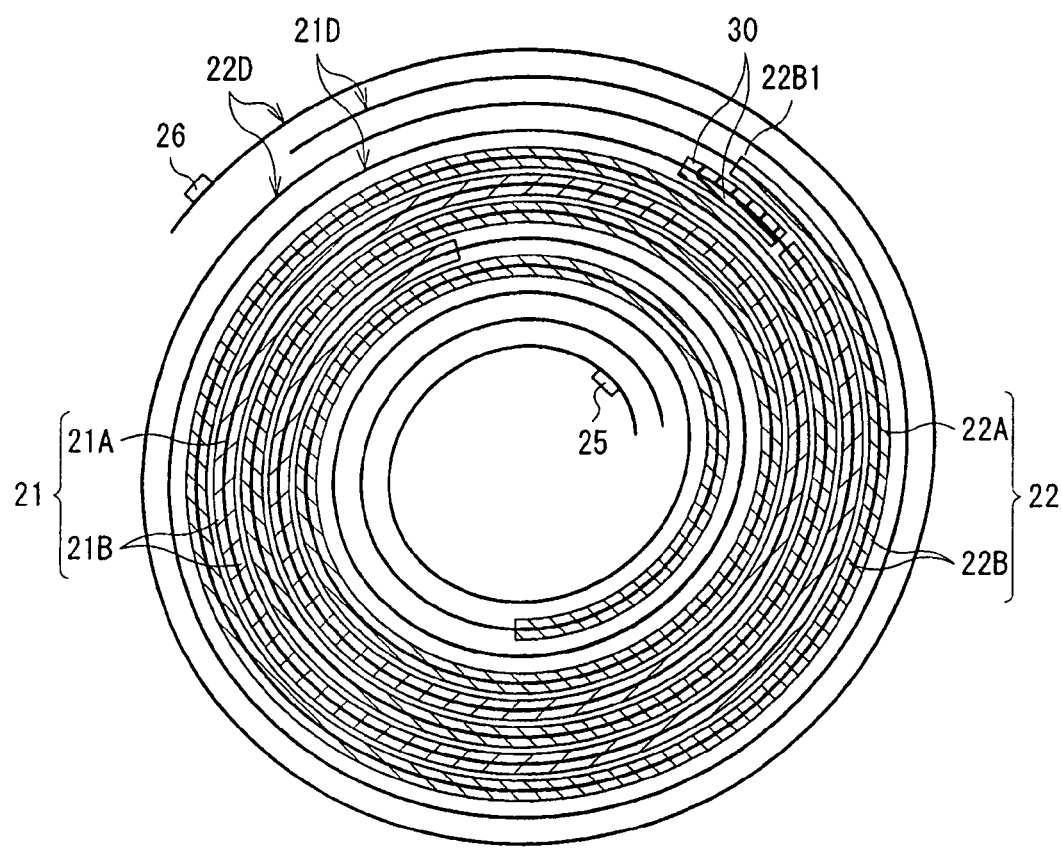
FIG. 7 is a sectional view of a spirally wound body according to a third embodiment of the invention.

FIG. 7 shows a sectional view of the spirally wound body 20 according to a third embodiment of the invention. The spirally wound body 20 has the same structure as that in the first embodiment, except that the exposed cathode region 21D includes the insulating protective member 30 on an outer side and an inner side of the exposed cathode region 21D in a position opposed to the outer end portion 22B1 of the anode active material layer 22B in one turn inside the outer end portion 22B1, and the spirally wound body 20 can be formed in the same manner. Therefore, like components are denoted by like numerals as of the first embodiment. In FIG. 7, the separator 23 is not shown.

In the embodiment, as described above, the exposed cathode region 21D includes the insulating protective member 30 on an outer side and an inner side of the exposed cathode region 21D in a position opposed to the outer end portion 22B1 of the anode active material layer 22B in one turn inside the outer end portion 22B1. Therefore, in the secondary battery, a very small short circuit between the step formed by the outer end portion 22B1 of the anode active material layer 22B and the exposed cathode region 21B can be prevented, and even if a very small short circuit occurs, generated heat is released to an outer side of the spirally wound body 20, so safety can be improved.

FOURTH EMBODIMENT

Figure 8:
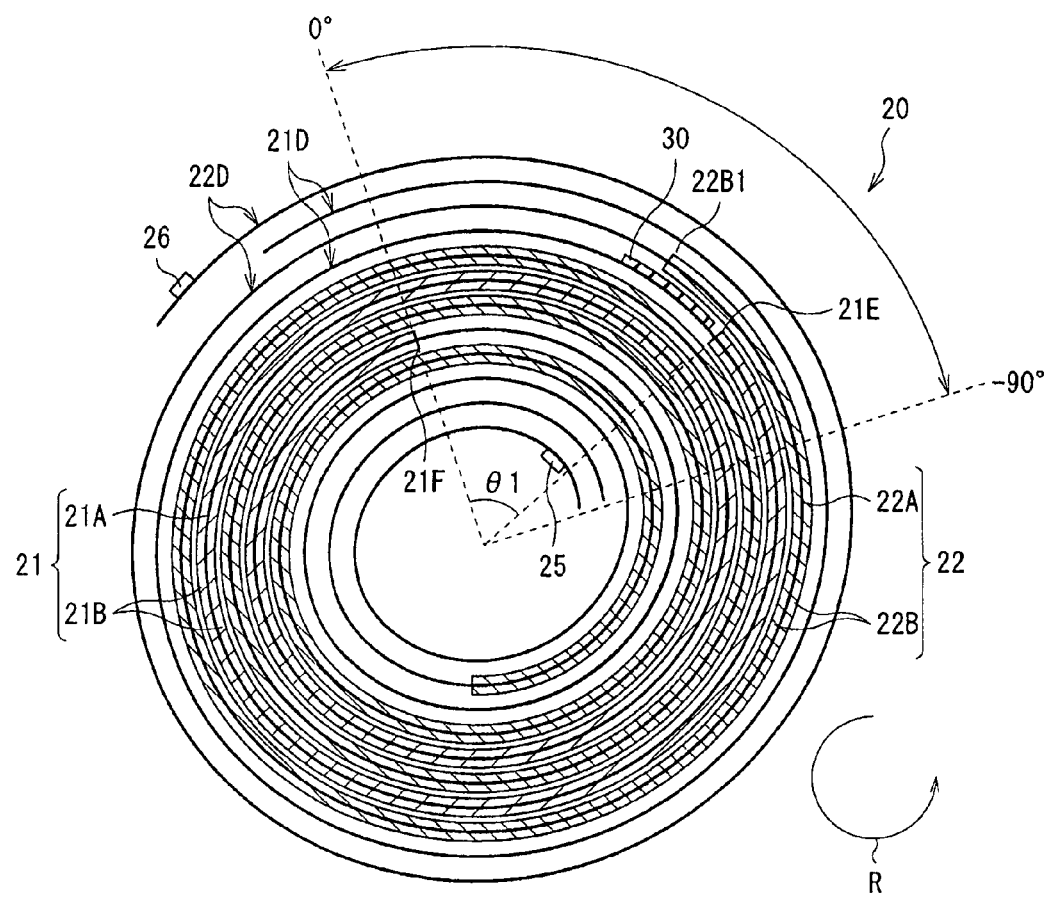
FIG. 8 is a sectional view of a spirally wound body according to a fourth embodiment of the invention.

FIG. 8 shows a sectional view of the spirally wound body 20 according to a fourth embodiment of the invention. The spirally wound body 20 has the same structure as that in the first embodiment, except that a positional relationship between an outer end portion 21E and a central end portion 21F in the cathode 21 is adjusted to enhance the roundness of the spirally wound body 20, and the spirally wound body 20 can be formed in the same manner. Therefore, like components are denoted by like numerals as of the first embodiment. In FIG. 8, the separator 23 is not shown.

In the cathode active material layer 21B, a central angle $\theta 1$ between the outer end portion 21E and the central end portion 21F at the center of the spirally wound body 20 (hereinafter simply referred to as "central angle $\theta 1$") is within a range from 0° to −90° inclusive from the central end portion 21F in a winding direction R. Therefore, in the secondary battery, the roundness of the spirally wound body 20 can be enhanced, and the pressure between the cathode 21 and the anode 22 in the spirally wound body 20 can be equalized, thereby the cycle characteristics and reliability can be improved.

Herein, "a winding direction" means a direction from a center side to an outer side, and "−" means a direction opposite to the winding direction.

When the secondary battery is charged, lithium ions are extracted from the cathode 21, and are inserted into the anode 22 through the electrolyte solution with which the separator 23 is impregnated. When the secondary battery is discharged, the lithium ions are extracted from the anode 22 and are inserted into the cathode 21 through the electrolyte solution with which the separator 23 is impregnated. In this case, the central angle $\theta 1$ is within a range from 0° to −90° inclusive from the central end portion 21F in the winding direction R, so the roundness of the spirally wound body 20 is high, and the pressure between the cathode 21 and the anode 22 in the spirally wound body 20 is equalized. Therefore, a very small short circuit by the compression of the separator 23 can be prevented, and a decline in load characteristics or charge-discharge cycle characteristics due to the deposition of lithium can be prevented. Therefore, the cycle characteristics can be improved.

Thus, in the embodiment, in addition to effects described in the first embodiment, the central angle $\theta 1$ is within a range from 0° to −90° inclusive from the central end portion 21F in the winding direction R, so the roundness of the spirally wound body 20 can be enhanced, and the pressure between the cathode 21 and the anode 22 in the spirally wound body 20 can be equalized. Therefore, while maintaining a high capacity, the cycle characteristics and the reliability can be improved.

Figure 9:
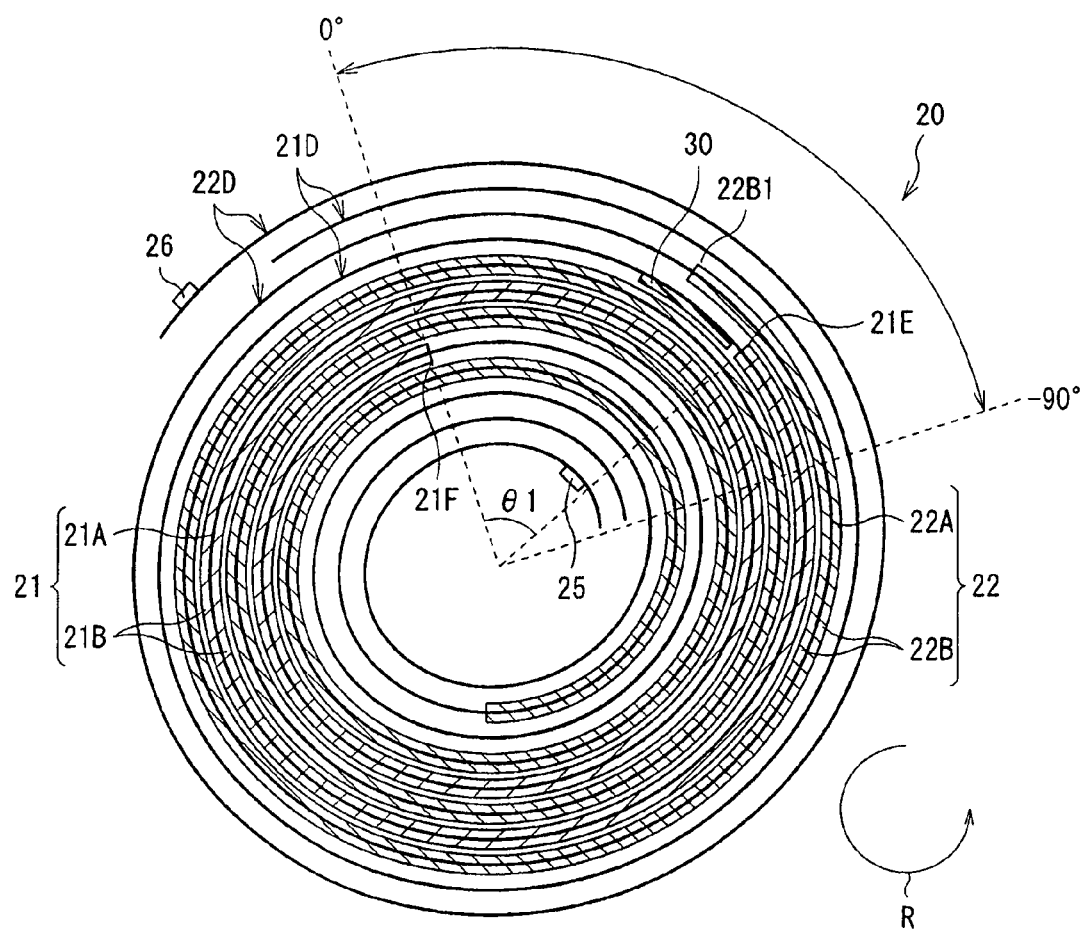
FIG. 9 is a sectional view of a modification of the spirally wound body shown in FIG. 8.
Figure 10:
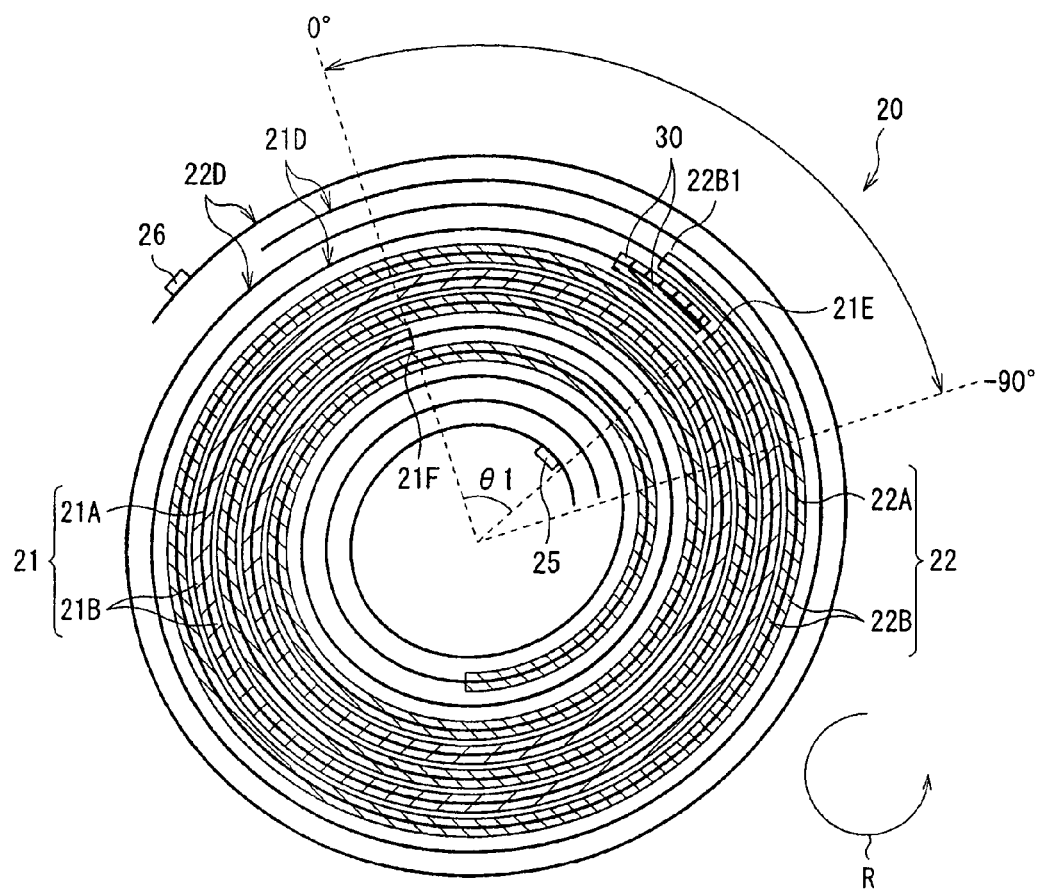
FIG. 10 is a sectional view of another modification of the spirally wound body shown in FIG. 8.

Further, in the spirally wound bodies 20 described in the second embodiment and the third embodiment, as shown in FIGS. 9 and 10, when the central angle $\theta 1$ is within a range from 0° to −90° inclusive from the central end portion 21F in the winding direction R, the cycle characteristics can be further improved.

FIFTH EMBODIMENT

Figure 11:
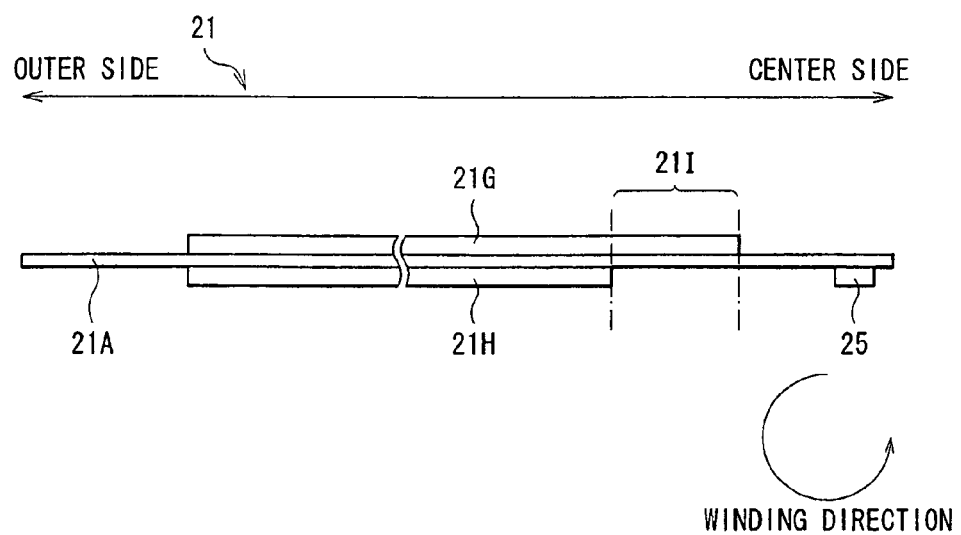
FIG. 11 is a sectional view of a cathode of a secondary battery according to a fifth embodiment of the invention before winding.
Figure 12:
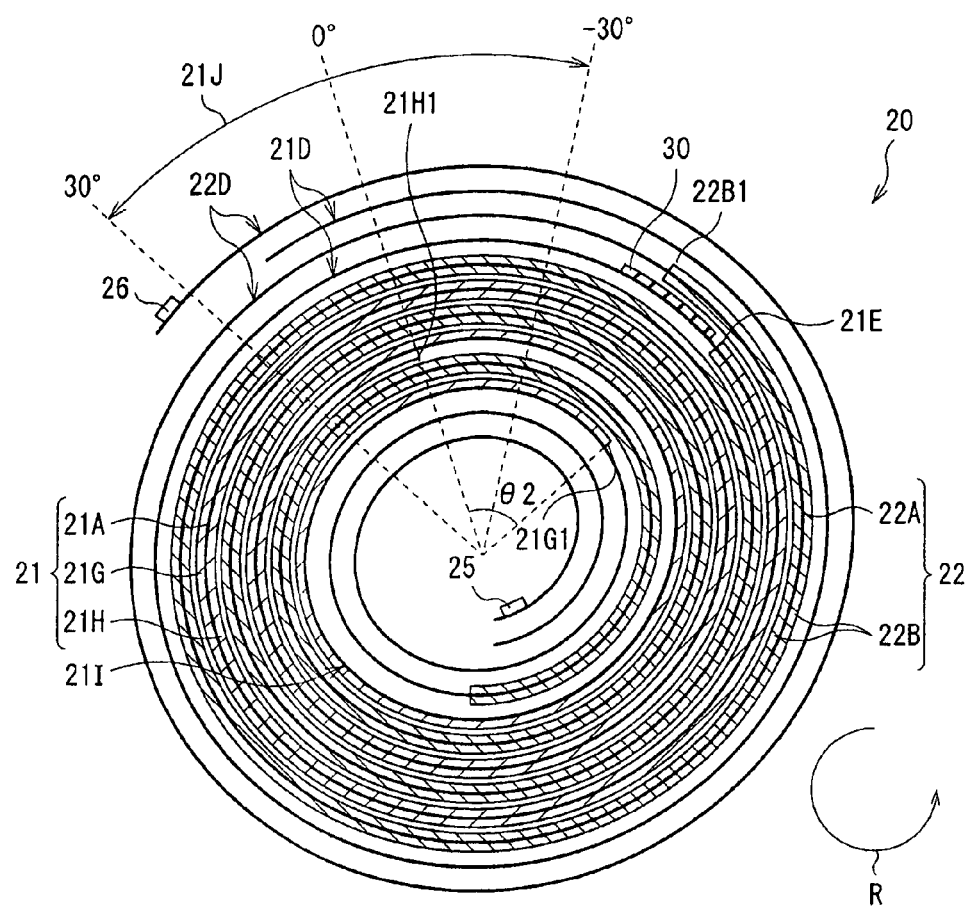
FIG. 12 is a sectional view of a spirally wound body including the cathode shown in FIG. 11.

FIG. 11 shows a sectional view of the cathode 21 of a secondary battery according to a fifth embodiment of the invention before winding, and FIG. 12 shows a sectional view of the spirally wound body 20 including the cathode 21. The secondary battery has the same structure as that in the first embodiment, except that the structure of the cathode 21 on a center side is adjusted so as to improve the cycle characteristics, and the secondary battery can be manufactured in the same manner. Therefore, like components are denoted by like numerals as of the first embodiment. In FIG. 12, the separator 23 is not shown.

The cathode 21 has a structure in which an outer cathode active material layer 21G and an inner cathode active material layer 21H are disposed on an outer surface and an inner surface of the strap-shaped cathode current collector 21A, respectively. Moreover, the outer cathode active material layer 21G is longer than the inner cathode active material layer 21H in a central end portion, and a longer portion of the outer cathode active material layer 21G is a one-side region 21I, that is, a region where only one surface of the cathode current collector 21A is covered with the outer cathode active material layer 21G. The above-described cathode lead 25 is connected to near a central end portion of the cathode current collector 21A.

The outer cathode active material layer 21G and the inner cathode active material layer 21H are made of the same material as that of the above-described cathode active material layer 21B.

A central angle $\theta 2$ between a central end portion 21G1 of the outer cathode active material layer 21G and a central end portion 21H1 of the inner cathode active material layer 21H at the center of the spirally wound body 20 (hereinafter simply referred to as "central angle $\theta 2$") is 72° or more, and the cathode lead 25 is disposed so as to avoid an inner end portion near region 21J, that is, a region from a central angle of 30° from a central end portion 21H1 of the inner cathode active material layer 21H in the winding direction R to a central angle of 30° from a central end portion 21H1 of the inner cathode active material layer 21H in a direction opposite to the winding direction R at the center of the spirally wound body 20. Thereby, in the secondary battery, a distortion in the winding shape in a center side can be reduced so as to prevent a break due to deterioration of an electrode.

Figure 13:
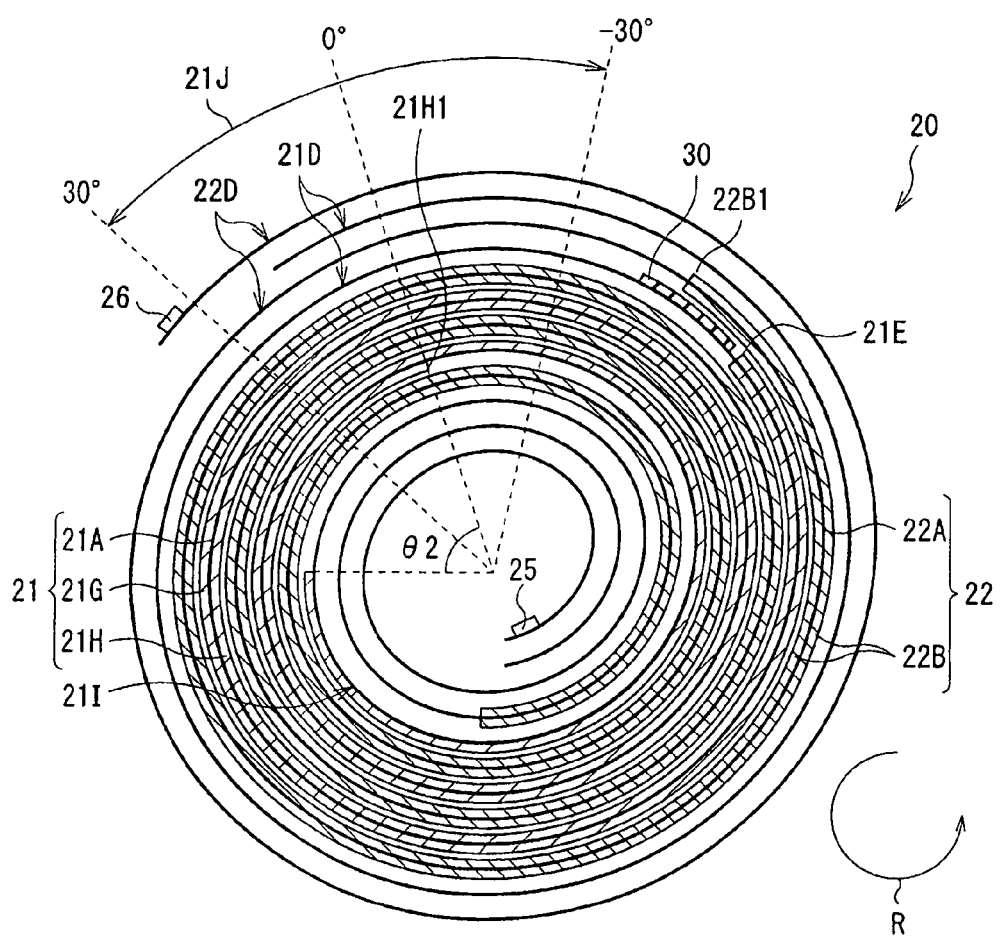
FIG. 13 is a sectional view of a modification of the spirally wound body shown in FIG. 12.

As a positional relationship between the central end portion 21G1 of the outer cathode active material layer 21G and the central end portion 21H1 of the inner cathode active material layer 21H, the central angle $\theta 2$ may be 72° or more, and the length of the one-side region 21I (refer to FIG. 11) is not specifically limited. For example, as shown in FIG. 12, the one-side region 21I may be disposed in one turn or more of the cathode 21, or as shown in FIG. 13, the one-side region 21I is disposed in less than one turn of the cathode 21.

When the secondary battery is charged, lithium ions are extracted from the cathode 21, and are inserted into the anode 22 through the electrolyte solution with which the separator 23 is impregnated. When the secondary battery is discharged, the lithium ions are extracted from the anode 22 and are inserted into the cathode 21 through the electrolyte solution with which the separator 23 is impregnated. In this case, the central angle $\theta 2$ is 72° or more, and the cathode lead 25 is disposed so as to avoid the inner end portion near region 21J, so a step formed by the end portion 21G1 of the outer cathode active material layer 21G, the cathode lead 25 or the like does not overlap a step formed by the end portion 21H1 of the inner cathode active material layer 21H, and a distortion in the winding shape in the center side is reduced. Thereby, a break due to deterioration of the electrode can be prevented, so the cycle characteristics can be improved.

Thus, in the embodiment, in addition to the effects described in the first embodiment, the central angle $\theta 2$ is 72° or more, and the cathode lead 25 is disposed so as to avoid the inner end portion near region 21J, so distortion in the winding shape in the center side can be reduced. Therefore, while maintaining a high capacity, the cycle characteristics can be improved.

Figure 14:
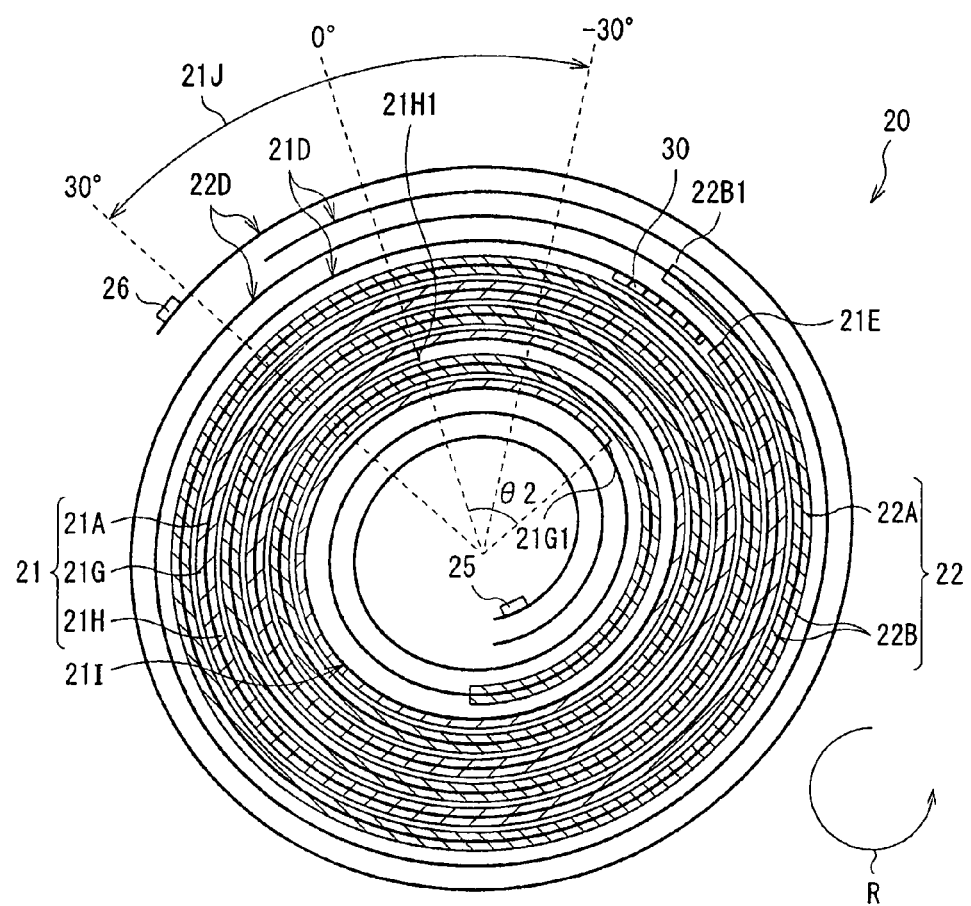
FIG. 14 is a sectional view of a modification of the spirally wound body shown in FIG. 12 in which the position of a protective member is changed.
Figure 15:
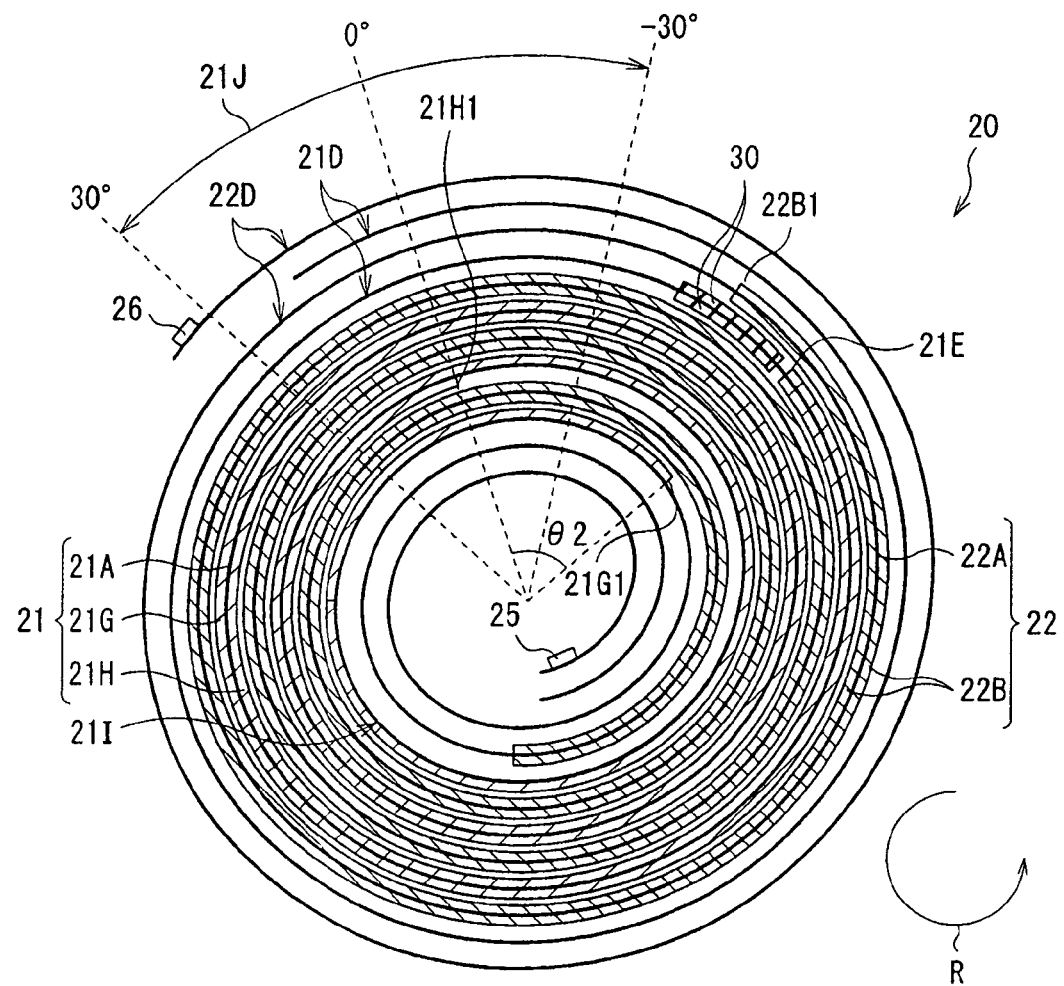
FIG. 15 is a sectional view of another modification of the spirally wound body shown in FIG. 12 in which the position of a protective member is changed.

In the spirally wound body 20 described in the second embodiment and the third embodiment, as shown in FIGS. 14 and 15, the central angle $\theta 2$ is 72° or more, and the cathode lead 25 is disposed so as to avoid the inner end portion near region 21J, thereby the cycle characteristics can be further improved. In this case, as shown in FIGS. 14 and 15, the one-side region 21I may be disposed in one turn or more of the cathode 21 or in less than one turn of the cathode 21 (not shown).

Figure 16:
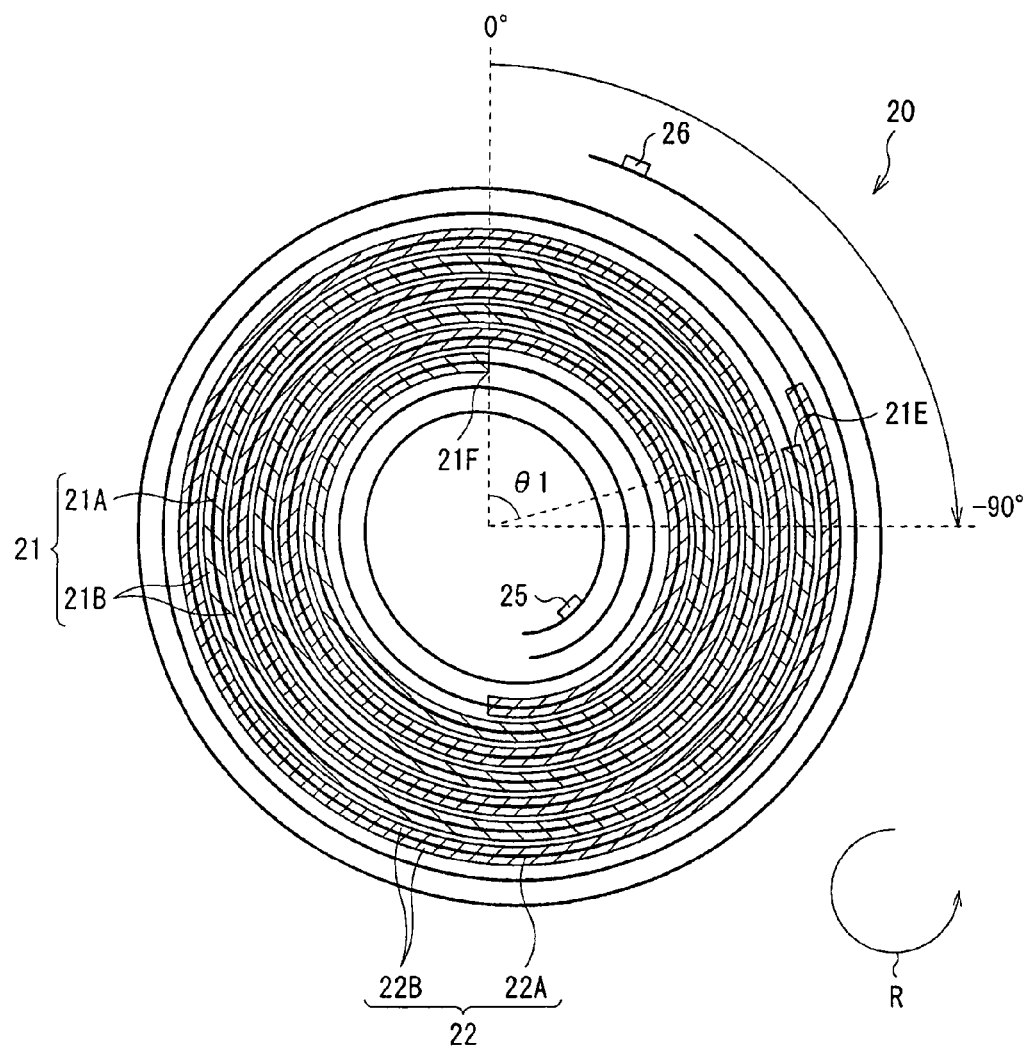
FIG. 16 is a sectional view of a structure according to the fourth embodiment in the case where no protective member is arranged.

Moreover, the fourth embodiment and the fifth embodiment are not necessarily combined with the first embodiment. More specifically, in the fourth embodiment, as shown in FIG. 16, the protective member 30 may not be disposed, and the central angle $\theta 1$ may be within a range from 0° to −90° inclusive from the central end portion 21F in the winding direction R. Thereby, the roundness of the spirally wound body 20 can be enhanced, and a pressure between the cathode 21 and the anode 22 in the spirally wound body 20 can be equalized. Therefore, while maintaining a high capacity, the cycle characteristics and the reliability can be improved.

Figure 17:
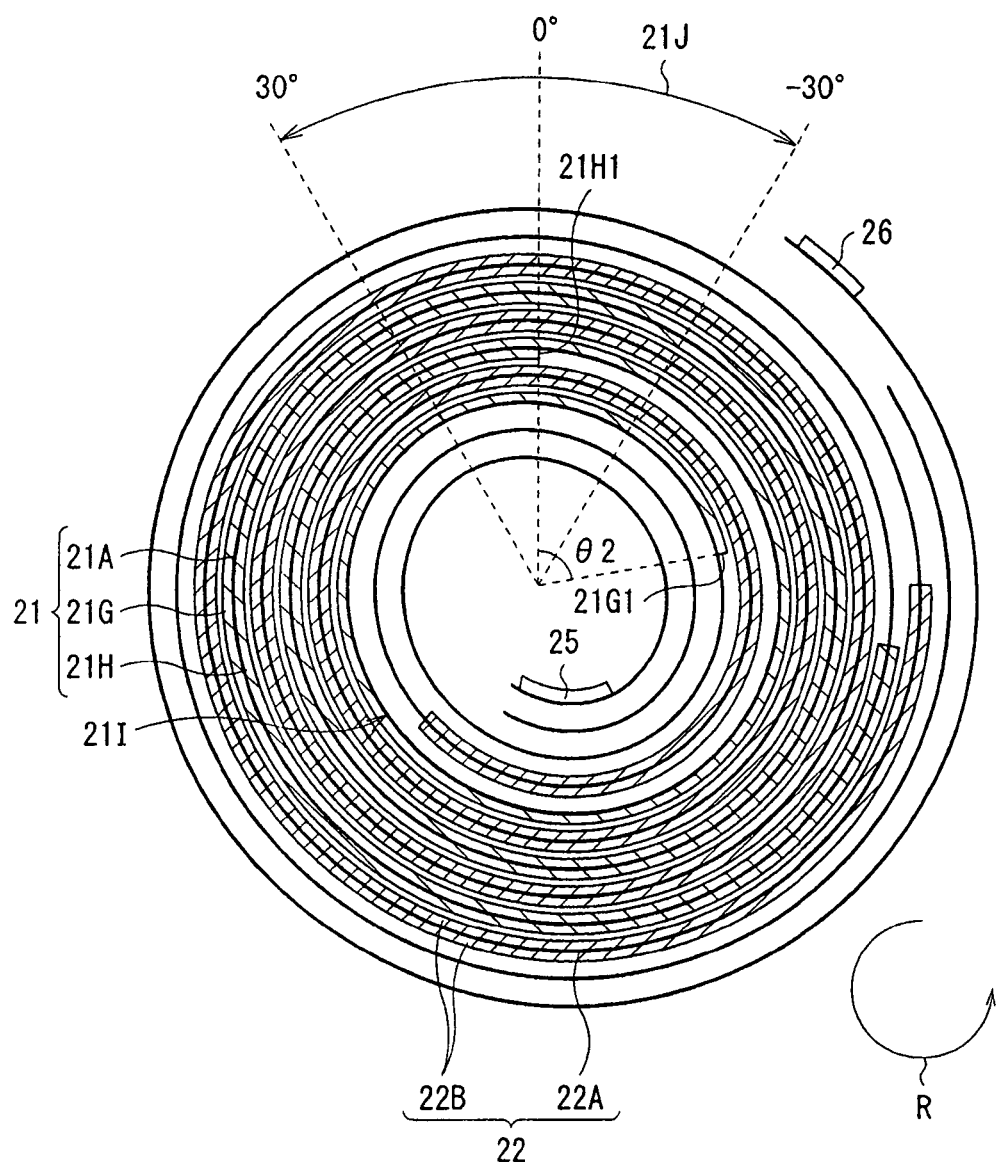
FIG. 17 is a sectional view of a structure according to the fifth embodiment in the case where no protective member is arranged.
Figure 18:
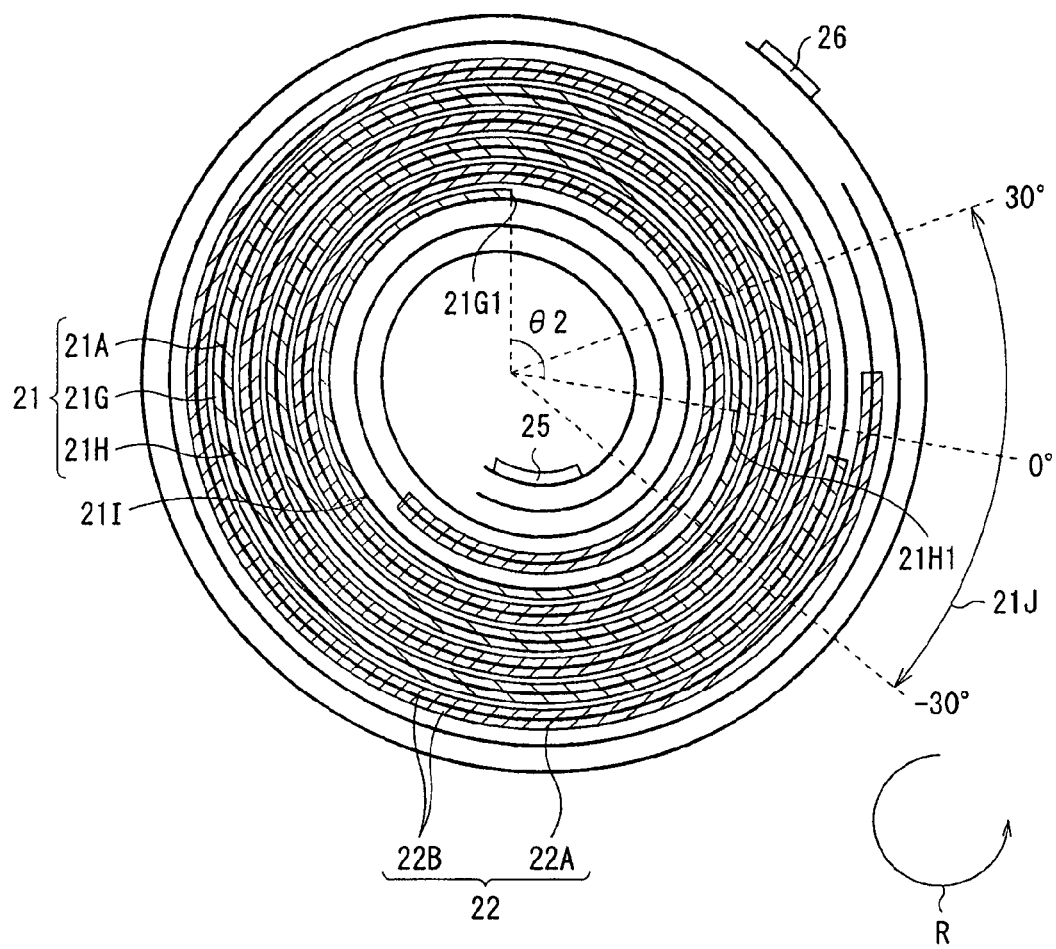
FIG. 18 is a sectional view of another structure according to the fifth embodiment in the case where no protective member is arranged.

In the fifth embodiment, as shown in FIG. 17, the protective member 30 may not be disposed, and the central angle θ2 may be 72° or more, and the cathode lead 25 may be disposed so as to avoid the inner end portion near region 21J. Thereby, a distortion in the winding shape in the center side can be reduced. Therefore, while maintaining a high capacity, the cycle characteristics can be improved. As shown in FIG. 17, the one-side region 21I may be disposed in one turn or more of the cathode 21, or as shown in FIG. 18, the one-side region 21I may be disposed in less than one turn of the cathode 21.

EXAMPLES

Specific examples of the invention will be described in detail below.

Examples 1-1 Through 1-4

Secondary batteries described in the first embodiment were formed. At first, lithium carbonate ($Li_2CO_3$) and cobalt carbonate ($CoCO_3$) were mixed at a ratio of $Li_2CO_3$:$CoCO_3$=0.5:1 (in a molar ratio) to form a mixture, and the mixture is fired in air at 900° C. for 5 hours to obtain lithium-cobalt complex oxide ($LiCoO_2$) as a cathode active material. Next, 91 parts by weight of lithium-cobalt complex oxide, 6 parts by weight of graphite as an electrical conductor and 3 parts by weight of polyvinylidene fluoride as a binder were mixed to form a cathode mixture. Next, the cathode mixture was dispersed in N-methyl-2-pyrrolidone as a solvent to form cathode mixture slurry, and the cathode mixture slurry was uniformly applied to both sides of the cathode current collector 21A made of aluminum foil with a thickness of 20 μm, and was dried. Then, the cathode active material layer 21B was formed through compression molding by a roller press so as to form the cathode 21. At that time, the exposed cathode region 21D was disposed in an outer end portion of the cathode 21.

After forming the cathode 21, an adhesive tape made of polyprolylene with a length of 15 mm as the protective member 30 was adhered to an outer side of the exposed cathode region 21D in a position opposed to the outer end portion 22B1 of the anode active material layer 22B in one turn inside the outer end portion. At that time, the width of the protective member was 5 mm larger (2.5 mm larger on one side in a width direction) than that of the cathode current collector 21A in Example 1-1, 4 mm larger (2 mm larger on one side in a width direction) than that of the cathode current collector 21A in Example 1-2, 1 mm larger (0.5 mm larger on one side in a width direction) than that of the cathode current collector 21A in Example 1-3, and the same as that of the cathode current collector 21A in Example 1-4. Next, the cathode lead 25 made of aluminum was attached to an end of the cathode current collector 21A.

Moreover, a CoSnC-containing material was formed as an anode active material. At first, cobalt powder, tin powder and carbon powder were prepared as materials, and the cobalt powder and the tin powder were alloyed to form cobalt-tin alloy powder, and then the carbon powder was added to and dry mixed with the alloy powder to form a mixture. Then, the CoSnC-containing material was obtained by the mechanochemical reaction of the mixture through the use of a planetary ball mill.

When the compositions of the obtained CoSnC-containing material was analyzed, the cobalt content was 29.3 wt %, the tin content was 49.9 wt % and the carbon content was 19.8 wt %. The carbon content was measured by a carbon/sulfur analyzer, and the contents of cobalt and tin were measured by ICP (Inductively Coupled Plasma) emission spectrometry. Moreover, when X-ray diffraction was performed on the obtained CoSnC-containing material, a diffraction peak having a broad half-width in which the diffraction angle 2θ was 1.0° or more was observed within a range of 2θ=20° to 50°. Further, when the XPS measurement was performed on the obtained CoSnC-containing material, the peak of C1s in the CoSnC-containing material was obtained in a region lower than 284.5 eV. In other words, it was confirmed that carbon included in the CoSnC-containing material was bonded to another element.

Next, 60 parts by weight of the CoSnC-containing material, 28 parts by weight of artificial graphite and 2 parts by weight of carbon black as electrical conductors and anode active materials, and 10 parts by weight of polyvinylidene fluoride as a binder were mixed to form an anode mixture. Next, the anode mixture was dispersed in N-methyle-2-pyrrolidone as a solvent to form anode mixture slurry, and the anode mixture slurry was applied to both sides of the anode current collector 22A made of copper foil with a thickness of 15 μm, and was dried. Then, the anode active material layer 22B was formed through compression molding by a roller press so as to form the anode 22. At that time, the exposed anode region 22D was disposed on an outer end portion of the anode 22, and the anode lead 26 made of nickel was attached to the exposed anode region 22D. At that time, the exposed anode region 22D extended to a position opposed to a position where the anode lead 26 is connected in one turn inside the position.

Next, the separator 23 made of a microporous polypropylene film with a thickness of 25 μm was prepared, and the cathode 21, the separator 23, the anode 22 and the separator 23 were laminated in this order to form a laminate, and then the laminate was spirally wound several times to form the spirally wound body 20. The maximum diameter of the body of the spirally wound body 20 was 13 mm.

After forming the spirally wound body 20, the spirally wound body 20 was sandwiched between a pair of insulating plates 12 and 13, and the anode lead 26 was welded to the battery can 11, and the cathode lead 25 was welded to the safety valve mechanism 15, and the spirally wound body 20 was contained in the battery can 11 with an internal diameter of 13.4 mm. After that, the electrolyte solution was put into the battery can 11. The electrolyte solution was formed through mixing 50 vol % of ethylene carbonate and 50 vol % of diethyl carbonate to form a solvent, and dissolving 1 mol/$dm^3$ of $LiPF_6$ as an electrolyte salt in the solvent, and the electrolyte solution was used.

After the electrolyte solution was injected into the battery can 11, the battery cover 14 was caulked to the battery can 11 by the gasket 17, thereby the cylindrical type secondary battery with an external diameter of 14 mm and a height of 43 mm was obtained.

Examples 2-1 Through 2-4

Secondary batteries described in the second embodiment were formed. The secondary batteries were formed as in the case of Examples 1-1 through 1-4, except that an adhesive tape made of polypropylene as the protective member 30 was adhered to on an inner side of the exposed cathode region 21D in a position opposed to the outer end portion 22B1 of the anode active material layer 22B in one turn inside the outer end portion. At that time, the width of the protective member 30 was 5 mm larger (2.5 mm larger on one side in a width direction) than that of the cathode current collector 21A in Example 2-1, 4 mm larger (2 mm larger on one side in a width direction) than that of the cathode current collector 21A in Example 2-2, 1 mm larger (0.5 mm larger on one side in a width direction) than that of the cathode current collector 21A in Example 2-3, and the same as that of the cathode current collector 21A in Example 2-4.

Examples 3-1 Through 3-4

Secondary batteries described in the third embodiment were formed. The secondary batteries were formed as in the case of Examples 1-1 through 1-4, except that an adhesive tape made of polypropylene as the protective member 30 was adhered to on an outer side and an inner side of the exposed cathode region 21D in a position opposed to the outer end portion of the anode active material layer 22B in one turn inside the outer end portion. At that time, the width of the protective member 30 was 5 mm larger (2.5 mm larger on one side in a width direction) than that of the cathode current collector 21A in Example 3-1, 4 mm larger (2 mm larger on one side in a width direction) than that of the cathode current collector 21A in Example 3-2, 1 mm larger (0.5 mm larger on one side in a width direction) than that of the cathode current collector 21A in Example 3-3, and the same as that of the cathode current collector 21A in Example 3-4.

Figure 19:
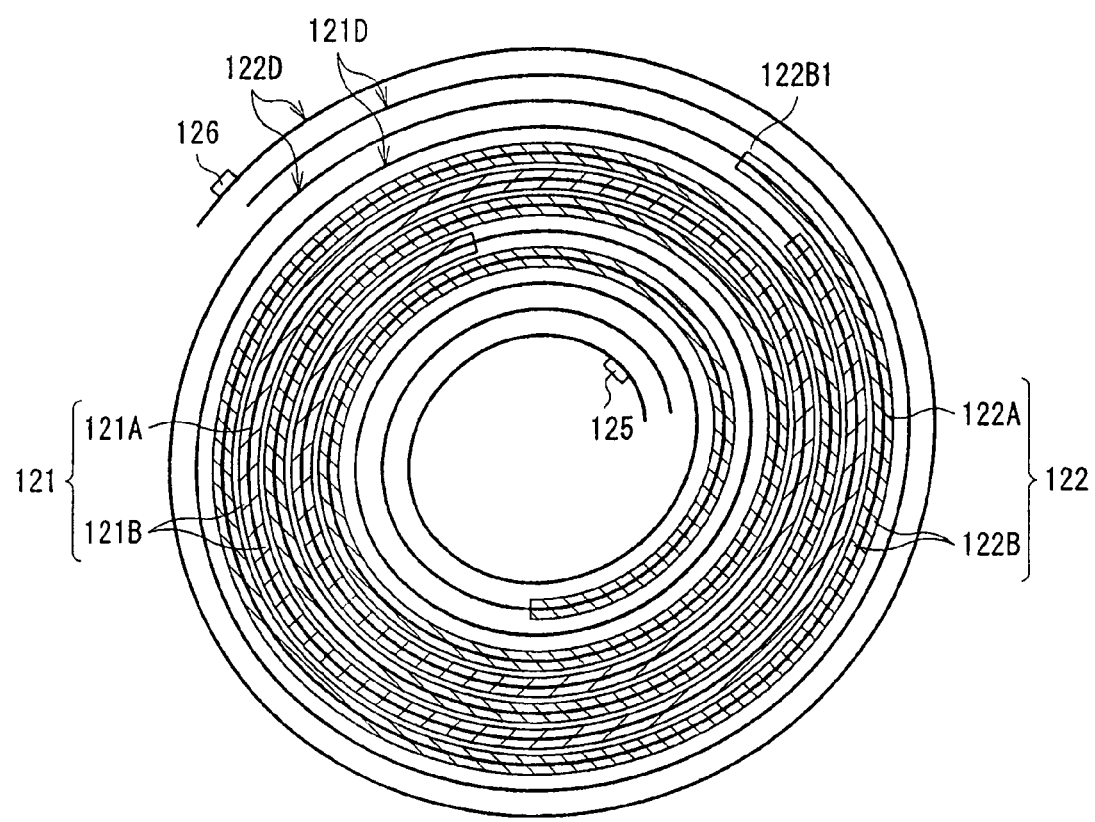
FIG. 19 is a sectional view of a spirally wound body according to Comparative Example 1 of the invention.

As Comparative Example 1 relative to Examples 1-1 through 1-4, Examples 2-1 through 2-4 and Examples 3-1 through 3-4, as shown in FIG. 19, a secondary battery was formed as in the case of Examples 1-1 through 1-4, except that the protective member was not used, and an exposed cathode region 121D extended to a position opposed to a position where an anode lead 126 of an exposed anode region 122D is connected in one turn inside the position. In FIG. 19, like components are denoted by like numerals as of FIGS. 1 through 7 which are incremented by 100.

Five secondary batteries of each of Examples 1-1 through 1-4, Examples 2-1 through 2-4 and Examples 3-1 through 3-4 and Comparative Example 1 were formed, and the cycle characteristics of the secondary batteries were determined. The obtained results are shown in Table 1. In Table 1, as a difference between the width of the protective member and the width of the cathode current collector, a value after subtracting the width of the cathode current collector from the width of the protective member ((the width of the protective member)−(the width of the cathode current collector)) is shown, and "+" means that the width of the protective member is larger than the width of the cathode current collector.

TABLE 1

| | PRESENCE/ ABSENCE OF PROTECTIVE MEMBER | DIFFERENCE BETWEEN WIDTHS OF PROTECTIVE MEMBER AND CATHODE CURRENT COLLECTOR (mm) | ONE TURN INSIDE POSITION WHERE ANODE LEAD WAS CONNECTED | CAPACITY RETENTION RATIO (%) | | | | |
|---|---|---|---|---|---|---|---|---|
| | | | | BATTERY 1 | BATTERY 2 | BATTERY 3 | BATTERY 4 | BATTERY 5 |
| EXAMPLE 1-1 | PRESENT | +5 | EXPOSED ANODE REGION | 84.7 | 85.2 | 84.8 | 84.3 | 83.8 |
| EXAMPLE 1-2 | PRESENT | +4 | EXPOSED ANODE REGION | 84.1 | 85.3 | 84.9 | 84.0 | 83.8 |
| EXAMPLE 1-3 | PRESENT | +1 | EXPOSED ANODE REGION | 83.1 | 84.5 | 83.8 | 84.3 | 82.8 |
| EXAMPLE 1-4 | PRESENT | 0 | EXPOSED ANODE REGION | 79.5 | 78.5 | 75.6 | 79.8 | 80.2 |
| EXAMPLE 2-1 | PRESENT | +5 | EXPOSED ANODE REGION | 82.7 | 83.7 | 81.9 | 83.1 | 84.5 |
| EXAMPLE 2-2 | PRESENT | +4 | EXPOSED ANODE REGION | 82.6 | 83.5 | 82.4 | 83.0 | 83.5 |
| EXAMPLE 2-3 | PRESENT | +1 | EXPOSED ANODE REGION | 82.5 | 83.7 | 81.5 | 82.3 | 84.4 |
| EXAMPLE 2-4 | PRESENT | 0 | EXPOSED ANODE REGION | 79.1 | 79.5 | 75.3 | 80.1 | 79.5 |
| EXAMPLE 3-1 | PRESENT | +5 | EXPOSED ANODE REGION | 84.7 | 84.7 | 84.9 | 85.1 | 84.8 |
| EXAMPLE 3-2 | PRESENT | +4 | EXPOSED ANODE REGION | 84.1 | 83.7 | 83.9 | 84.7 | 84.9 |
| EXAMPLE 3-3 | PRESENT | +1 | EXPOSED ANODE REGION | 84.6 | 84.1 | 85.3 | 85.0 | 83.4 |

TABLE 1-continued

| | PRESENCE/ ABSENCE OF PROTECTIVE MEMBER | DIFFERENCE BETWEEN WIDTHS OF PROTECTIVE MEMBER AND CATHODE CURRENT COLLECTOR (mm) | ONE TURN INSIDE POSITION WHERE ANODE LEAD WAS CONNECTED | CAPACITY RETENTION RATIO (%) | | | | |
|---|---|---|---|---|---|---|---|---|
| | | | | BATTERY 1 | BATTERY 2 | BATTERY 3 | BATTERY 4 | BATTERY 5 |
| EXAMPLE 3-4 | PRESENT | 0 | EXPOSED ANODE REGION | 80.3 | 82.5 | 79.6 | 78.8 | 80.2 |
| COMPARATIVE EXAMPLE 1 | ABSENT | — | EXPOSED CATHODE REGION | 55.4 | 58.6 | 52.9 | 49.5 | 56.7 |

As the cycle characteristics, the capacity retention ratio in the 200th cycle to the discharge capacity in the second cycle (discharge capacity in the 200th cycle)/(discharge capacity in the second cycle)×100(%) was determined. At that time, as charge and discharge, the secondary batteries were charged at a constant current and a constant voltage at 45° C. under conditions that an upper limit voltage was 4.2 V, and a current was 1 C, and then the secondary batteries were discharged at a constant current under conditions that a current was 1 C, and an end voltage was 2.5 V. In addition, 1 C means a current value at which a battery capacity can be discharged for 1 hour.

It is evident from Table 1 that in Examples 1-1 through 1-4, Examples 2-1 through 2-4 and Examples 3-1 through 3-4 in which the protective member 30 was included, and the exposed anode region 22D extended to a position opposed to a position where the anode lead 26 is connected in one turn inside the position, the capacity retention ratio was improved, compared to Comparative Example 1 in which the protective member was not included, and the exposed cathode region 121D extended to a position opposed to a position where the anode lead 126 of the exposed anode region 122D.

Moreover, in Examples 1-1 through 1-3 in which the width of the protective member 30 was 5 mm, 4 mm or 1 mm larger than the width of the cathode current collector 21A, a stable and high capacity retention ratio of 80% or more was obtained, and the capacity retention ratio was improved, compared to Example 1-4 in which the width of the protective member 30 was the same as that of the cathode current collector 21A. In Examples 2-1 through 2-4 and Examples 3-1 through 3-4, the same results were obtained.

In other words, it was found out that when the protective member 30 was disposed on at least one of an outer side and an inner side of the exposed cathode region 21D in a position opposed to the outer end portion 22B1 of the anode active material layer 22B in one turn inside the outer end portion, and the exposed anode region 22D extended to a position opposed to a position where the anode lead 26 was connected in one turn inside the position, the cycle characteristics could be improved.

Moreover, it was found out that when the protective member 30 was formed so as to have a width which was 0.5 mm to 5 mm larger than that of the cathode current collector 21, the cycle characteristics could be improved.

Examples 4-1 Through 4-4

Secondary batteries shown in FIG. 16 were formed. At first, the cathode 21 was formed as in the case of Examples 1-1 through 1-4, and the cathode lead 25 made of aluminum was attached to an end of the cathode current collector 21A. Then, the anode 22 was formed as in the case of Examples 1-1 through 1-4, and the anode lead 26 made of nickel was attached to an end of the anode current collector 22A.

Next, the separator 23 made of a microporous polypropylene film with a thickness of 25 μm was prepared, and the cathode 21, the separator 23, the anode 22 and the separator 23 were laminated in this order to form a laminate, and then the laminate was spirally wound several times to form the spirally wound body 20. The maximum diameter of the body of the spirally wound body 20 was 13 mm. At that time, in Example 4-1, the central angle θ1 was 0° from the central end portion 21F in the winding direction R, that is, the outer end portion 21E and the central end portion 21F overlapped each other in a circumferential direction. Moreover, the central angle θ1 was −30° in Example 4-2, −60° in Example 4-3 and −90° in Example 4-4. In addition, "−" means a direction opposite to the winding direction R.

After forming the spirally wound body 20, as in the case of Examples 1-1 through 1-4, the spirally wound body 20 was contained in the battery can 11 with an internal diameter of 13.4 mm, and the electrolyte solution was injected into the battery can 11. After that, the battery cover 14 was caulked to the battery can 11 by the gasket 17, thereby the cylindrical type secondary battery with an external diameter of 14 mm and a height of 43 mm was obtained.

As Comparative Examples 4-1 through 4-4 relative to Examples 4-1 through 4-4, secondary batteries were formed as in the case of Examples 4-1 through 4-4, except that the central angle was 60° in Comparative Example 4-1, 120° in Comparative Example 4-2, 180° in Comparative Example 4-3 and 240° in Comparative Example 4-4.

Five secondary batteries of each of Examples 4-1 through 4-4 and Comparative Examples 4-1 through 4-4 were formed, and the cycle characteristics were determined. The cycle characteristics were determined as in the case of Examples 1-1 through 1-4, and a capacity retention ratio of 80% or more is considered as an acceptable value. The obtained results are shown in Table 2.

TABLE 2

| | CENTRAL ANGLE θ1 (°) | CAPACITY RETENTION RATIO (%) | | | | |
|---|---|---|---|---|---|---|
| | | BATTERY 1 | BATTERY 2 | BATTERY 3 | BATTERY 4 | BATTERY 5 |
| EXAMPLE 4-1 | 0 | 85.5 | 86.4 | 84.8 | 86.2 | 87.5 |
| EXAMPLE 4-2 | −30 | 83.1 | 81.5 | 84.5 | 82.7 | 83.6 |
| EXAMPLE 4-3 | −60 | 81.0 | 81.4 | 83.1 | 82.2 | 83.0 |
| EXAMPLE 4-4 | −90 | 81.1 | 80.9 | 83.5 | 82.1 | 82.6 |
| COMPARATIVE EXAMPLE 4-1 | 60 | 73.6 | 69.8 | 55.9 | 71.5 | 74.2 |
| COMPARATIVE EXAMPLE 4-2 | 120 | 69.8 | 76.8 | 68.3 | 75.5 | 64.5 |
| COMPARATIVE EXAMPLE 4-3 | 180 | 70.5 | 73.2 | 67.2 | 77.3 | 75.5 |
| COMPARATIVE EXAMPLE 4-4 | 240 | 71.5 | 75.6 | 73.6 | 78.3 | 76.8 |

It is evident from Table 2 that in Examples 4-1 through 4-4 in which the central angle θ1 was within a range from 0° to −90° from the central end portion 21F in the winding direction R, the capacity retention ratio was improved, compared to Comparative Examples 4-1 through 4-4 in which the central angle was within a range from 60° to 240°.

In other words, it was found out that when the central angle θ1 was within a range from 0° to −90° inclusive from the central end portion 21F in the winding direction R, the cycle characteristics could be improved.

Examples 5-1 Through 5-3

Secondary batteries shown in FIGS. 17 and 18 were formed. At first, as in the case of Examples 1-1 through 1-4, cathode mixture slurry was formed, and the cathode mixture slurry was uniformly applied to both sides of the cathode current collector 21A made of aluminum foil with a thickness of 20 μm, and was dried, and then the outer cathode active material layer 21G and the inner cathode active material layer 21H were formed through compression molding by a roller press so as to form the cathode 21. At that time, the central angle θ2 was 72° in Example 5-1, 170° in Example 5-2 and 90° in Example 5-3.

Next, the cathode lead 25 was attached to near a central end portion of the cathode current collector 21A. At that time, the cathode lead 25 was disposed so as to avoid the inner end portion near region 21J.

Moreover, as in the case of Examples 1-1 through 1-4, the anode 22 was formed, and the anode lead 26 made of nickel was attached to an end of the anode current collector 22A.

Next, the separator 23 made of a microporous polypropylene film with a thickness of 25 μm was prepared, and the cathode 21, the separator 23, the anode 22 and the separator 23 were laminated in this order to form a laminate, and then the laminate was spirally wound several times to form the spirally wound body 20. The maximum diameter of the body of the spirally wound body 20 was 13 mm.

After forming the spirally wound body 20, as in the case of Examples 1-1 through 1-4, the spirally wound body 20 was contained in the battery can 11 with an internal diameter of 13.4 mm, and the electrolyte solution was injected into the battery can 11. After that, the battery cover 14 was caulked to the battery can 11 by the gasket 17, thereby the cylindrical type secondary battery with an external diameter of 14 mm and a height of 43 mm was obtained.

Figure 20:
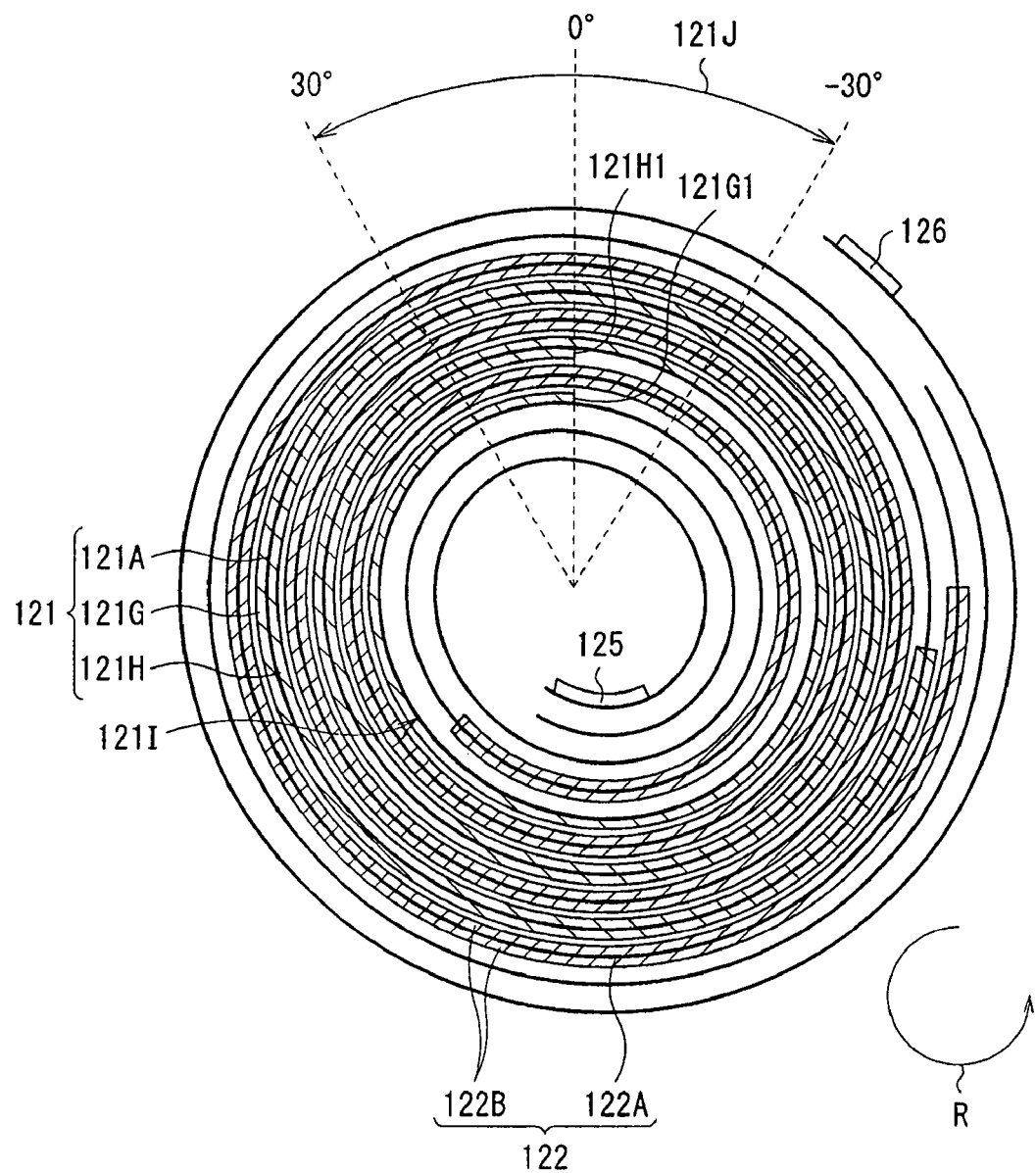
FIG. 20 is a sectional view of a spirally wound body according to Comparative Example 5-1 of the invention.
Figure 21:
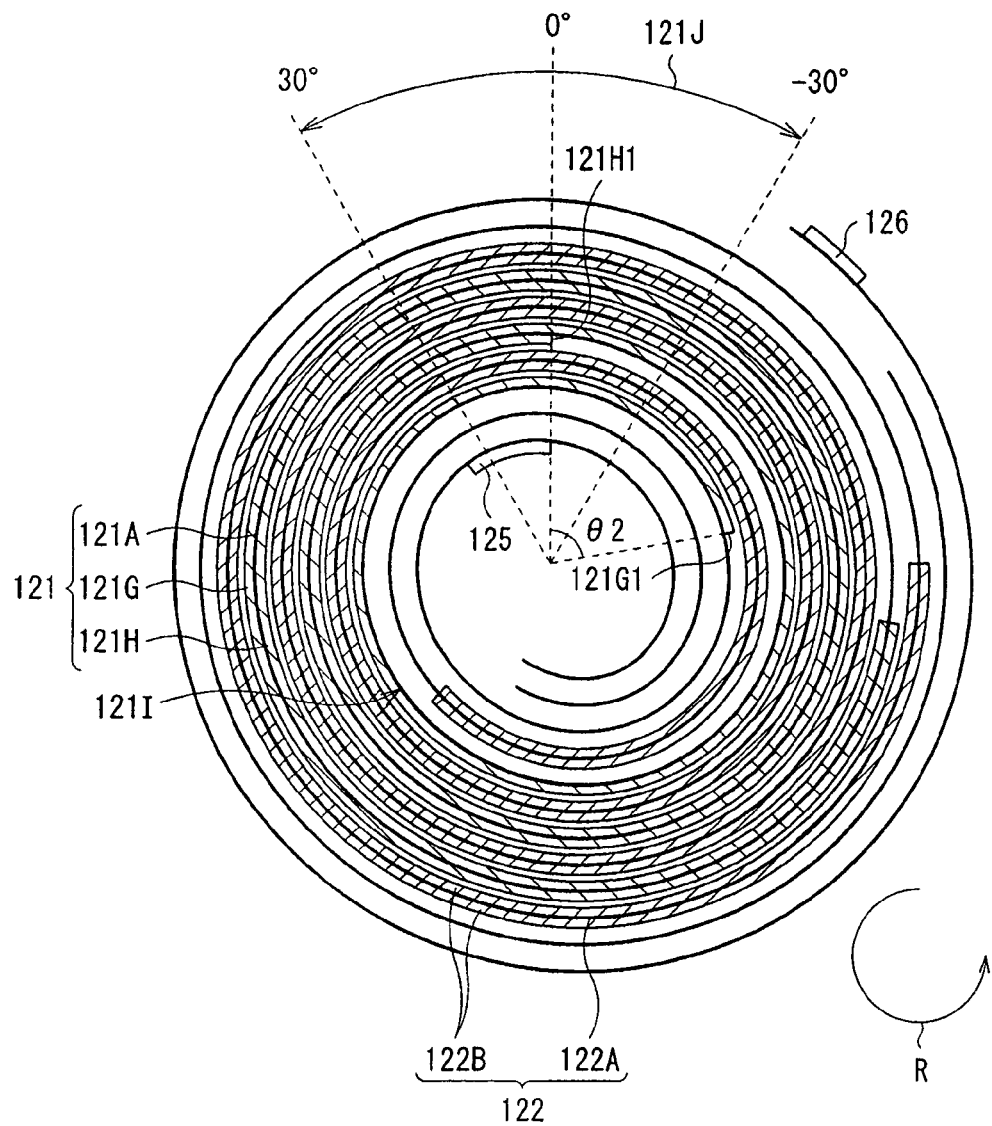
FIG. 21 is a sectional view of a spirally wound body according to Comparative Example 5-2 of the invention.

As Comparative Example 5-1 relative to Examples 5-1 through 5-3, a secondary battery was formed as in the case of Examples 5-1 through 5-3, except that as shown in FIG. 20, the central angle θ2 was 0°. Moreover, as Comparative Example 5-2, a secondary battery was formed as in the case of Example 5-1, except that as shown in FIG. 21, an end portion of a cathode lead 125 was aligned with a central end portion 121H1 of an inner cathode active material layer 121H so that the cathode lead 125 overlapped an inner end portion near region 121J. In FIGS. 20 and 21, like components are denoted by like numerals as of FIGS. 17 and 18 which are incremented by 100.

Five secondary batteries of each of Examples 5-1 through 5-3 and Comparative Examples 5-1 and 5-2 were formed, and the breaking strength of the cathode 21 in each secondary battery was determined. The obtained results are shown in Table 3.

TABLE 3

| | CENTRAL ANGLE θ2 (°) | POSITIONAL RELAIONSHIP OF CATHODE LEAD TO INNER END PORTION NEAR REGION | BREAKING STRENGTH (N/mm) | | | | |
|---|---|---|---|---|---|---|---|
| | | | BATTERY 1 | BATTERY 2 | BATTERY 3 | BATTERY 4 | BATTERY 5 |
| EXAMPLE 5-1 | 72 | AVOID | 2.6 | 2.8 | 2.4 | 2.5 | 2.6 |
| EXAMPLE 5-2 | 170 | AVOID | 2.5 | 2.4 | 2.3 | 2.7 | 2.5 |
| EXAMPLE 5-3 | 90 | AVOID | 2.4 | 2.5 | 2.7 | 2.5 | 2.7 |
| COMPARATIVE EXAMPLE 5-1 | 0 | AVOID | 1.5 | 1.6 | 1.7 | 1.4 | 1.6 |
| COMPARATIVE EXAMPLE 5-2 | 72 | OVERLAP | 1.0 | 1.0 | 1.2 | 1.5 | 1.3 |

For the measurement of the breaking strength, at first, after assembling the spirally wound body 20, the cathode 21 was taken out, and a test piece with a width of 15 mm and a length of 100 mm which included a portion covered with the outer cathode active material layer 21G and a portion where the cathode current collector 21A was exposed on a fifty-fifty basis so as to place the central end portion 21G1 of the outer cathode active material layer 21G around a midpoint of the test piece was taken out from the cathode 21. The length direction in the test piece matches the winding direction of the cathode 21. A breaking strength of 2.0 N/mm or more is considered as an acceptable value.

Moreover, the cycle characteristics of five secondary batteries of each of Examples 5-1 through 5-3 and Comparative Examples 5-1 and 5-2 were determined. The obtained results are shown in Table 4.

TABLE 4

|  | CENTRAL ANGLE θ2 (°) | POSITIONAL RELAIONSHIP OF CATHODE LEAD TO INNER END PORTION NEAR REGION | CAPACITY RETENTION RATIO (%) | | | | |
|---|---|---|---|---|---|---|---|
|  |  |  | BATTERY 1 | BATTERY 2 | BATTERY 3 | BATTERY 4 | BATTERY 5 |
| EXAMPLE 5-1 | 72 | AVOID | 83.7 | 85.2 | 84.8 | 84.3 | 83.8 |
| EXAMPLE 5-2 | 170 | AVOID | 82.7 | 84.2 | 82.8 | 81.9 | 82.6 |
| EXAMPLE 5-3 | 90 | AVOID | 84.5 | 85.2 | 86.7 | 86.9 | 85.9 |
| COMPARATIVE EXAMPLE 5-1 | 0 | AVOID | 65.2 | 59.5 | 63.5 | 50.5 | 67.5 |
| COMPARATIVE EXAMPLE 5-2 | 72 | OVERLAP | 52.8 | 65.4 | 75.1 | 68.7 | 64.2 |

It is evident from Tables 3 and 4 that in Examples 5-1 through 5-3 in which the central angle θ2 was 72° or more, better results of the breaking strength and the cycle characteristics were obtained, compared to Comparative Example 5-1 in which the central angle θ2 was 0°.

Moreover, compared between Example 5-1 and Comparative Example 5-2, in Comparative Example 5-2 in which the cathode lead 125 overlapped the inner end portion near region 121J, the breaking strength and the cycle characteristics declined largely, compared to Example 5-1.

In other words, it was found out that when the central angle θ2 was 72° or more, and the cathode lead 25 was disposed so as to avoid the inner end portion near region 21J, the breaking strength of the cathode 21 could be enhanced, and the cycle characteristics could be improved.

Although the invention is described referring to the embodiments and the examples, the invention is not limited to the embodiments and the examples, and can be variously modified. For example, in the embodiments and the examples, the case where the electrolyte solution which is a liquid electrolyte is used as an electrolyte is described; however, any other electrolyte may be used instead of the electrolyte solution. Examples of the other electrolyte include a gel electrolyte in which a high molecular weight compound holds an electrolyte solution, a solid electrolyte with ionic conductivity, a mixture of a solid electrolyte and an electrolyte solution and a mixture of a solid electrolyte and a gel electrolyte.

In a gel electrolyte, various high molecular weight compounds which are gelatinized through absorbing an electrolyte solution can be used. Examples of such a high molecular weight compound include a fluorine-based high molecular weight compound such as polyvinylidene fluoride, or a copolymer of vinylidene fluoride and hexafluoropropylene, an ether-based high molecular weight compound such as polyethylene oxide or a cross-link including polyethylene oxide, polyacrylonitrile, and the like. More specifically, in terms of stability of oxidation-reduction, the flurorine-based high molecular weight compound is preferable.

As the solid electrolyte, for example, an organic solid electrolyte formed through dispersing an electrolyte salt in a high molecular weight compound with ionic conductivity, or an inorganic solid electrolyte made of ion-conductive glass or ionic crystal can be used. At this time, as the high molecular weight compound, for example, an ether-based high molecular weight compound such as polyethylene oxide or a cross-link including polyethylene oxide, an ester-based high molecular weight compound such as polymethacrylate or an acrylate-based high molecular weight compound, a mixture thereof, or a copolymer thereof can be used. Moreover, as the inorganic solid electrolyte, lithium nitride, lithium iodide or the like can be used.

In the above embodiments and the examples, the cylindrical type secondary battery with a winding structure is described; however, the invention can be applied to any secondary battery with a winding structure.

Further, in the embodiments and the examples, the case where lithium was used as an electrode reactant is described; however, the invention can be applied to the case where any other Group 1 element such as sodium (Na) or potassium (K) in the long form of the periodic table of the elements, a Group 2 element such as magnesium or calcium (Ca) in the long form of the periodic table of the elements, other light metal such as aluminum, or an alloy including lithium or any of the above-described materials is used, and the same effects can be obtained. At this time, an anode active material capable of inserting and extracting the electrode reactant, a cathode active material, a solvent or the like is selected according to the electrode reactant.

It should be understood by those skilled in the art that various modifications, combinations, sub-combinations and alterations may occur depending on design requirements and other factors insofar as they are within the scope of the appended claims or the equivalents thereof.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A secondary battery, comprising:
a spirally wound body formed through laminating a cathode which includes a cathode active material layer on a strip-shaped cathode current collector and an anode which includes an anode active material layer on a strip-shaped anode current collector with a separator in between, and spirally winding the cathode and the anode, wherein:
the anode includes an anode active material comprising:
a CoSnC-containing material having a phase containing tin, cobalt and a first carbon, wherein a first carbon content ranges from about 9.9 wt % to about 29.7 wt %, a ratio of cobalt to a total of tin and cobalt ranges from about 30 wt % to about 70 wt %, and a 1s peak of the first carbon is obtained in a region lower than 284.5 eV by X-ray photoelectron spectroscopy; and
a second carbon,
the cathode includes an exposed cathode region in an outer end portion of the cathode, the exposed cathode region being a region in which the cathode current collector is not covered with the cathode active material layer and is exposed,
the exposed cathode region includes an insulating protective member on at least one of an outer side and an inner side of the exposed cathode region in a position opposed to an outer end portion of the anode active material layer in a single turn inside the outer end portion, and
the protective member is formed so as to have a width that ranges from about 0.5 mm to about 5 mm larger than the width of the cathode current collector.

2. A secondary battery according to claim 1, wherein
the anode includes an exposed anode region in an outer end portion of the anode, the exposed anode region in which the anode current collector is not covered with the anode active material layer and is exposed, and to which an anode lead is connected, and
the exposed anode region extends to a position opposed to a position where the anode lead is connected in one turn inside the position.

3. A secondary battery according to claim 1, wherein
the protective member is made of any one of polypropylene and polyethylene terephthalate.

4. A secondary battery according to claim 1, wherein
the cathode includes an outer cathode active material layer on an outer surface of the cathode current collector and an inner cathode active material layer on an inner surface of the cathode current collector,
a central angle between a central end portion of the outer cathode active material layer and a central end portion of the inner cathode active material layer at the center of the spirally wound body is 72° or more, wherein the cathode active material layer has an uneven termination point on the inner and outer surfaces of the cathode current collector, and
a cathode lead is connected to near a central end portion of the cathode current collector, and the cathode lead is disposed so as to avoid a region from a central angle of 30° from the central end portion of the inner cathode active material layer in a winding direction R to a central angle of 30° from the central end portion of the inner cathode active material layer in a direction opposite to the winding direction at the center of the spirally wound body.

5. A secondary battery, comprising:
a spirally wound body formed through laminating a cathode which includes a cathode active material layer on a strip-shaped cathode current collector and an anode which includes an anode active material layer on a strip-shaped anode current collector with a separator in between, and spirally winding the cathode and the anode, wherein:
the anode includes an anode active material comprising:
a CoSnC-containing material having a phase containing tin, cobalt and a first carbon, wherein a first carbon content ranges from about 9.9 wt % to about 29.7 wt %, a ratio of cobalt to a total of tin and cobalt ranges from about 30 wt % to about 70 wt %, and a 1s peak of the first carbon is obtained in a region lower than 284.5 eV by X-ray photoelectron spectroscopy; and
a second carbon,
and in the cathode active material layer, a central angle between an outer end portion and a central end portion at a center of the spirally wound body ranges from 0° to −90° inclusive from the central end portion in a winding direction.

6. A secondary battery, comprising:
a spirally wound body formed through laminating a cathode which includes a cathode active material layer on a strip-shaped cathode current collector and an anode which includes an anode active material layer on a strip-shaped anode current collector with a separator in between, and spirally winding the cathode and the anode, wherein:
the anode includes an anode active material comprising;
a CoSnC-containing material having a phase containing tin, cobalt and a first carbon, wherein a first carbon content ranges from about 9.9 wt % to about 29.7 wt %, a ratio of cobalt to a total of tin and cobalt ranges from about 30 wt % to about 70 wt %, and a 1s peak of carbon is obtained in a region lower than 284.5 eV by X-ray photoelectron spectroscopy; and
a second carbon,
the cathode includes an exposed cathode region in an outer end portion of the cathode, the exposed cathode region being a region in which the cathode current collector is not covered with the cathode active material layer and is exposed,
the exposed cathode region includes an insulating protective member on at least one of an outer side and an inner side of the exposed cathode region in a position opposed to an outer end portion of the anode active material layer in a single turn inside the outer end portion,
the cathode includes an outer cathode active material layer on an outer surface of the cathode current collector and an inner cathode active material layer on an inner surface of the cathode current collector,
a central angle between a central end portion of the outer cathode active material layer and a central end portion of the inner cathode active material layer at the center of the spirally wound body is 72° or more, wherein the cathode active material layer has an uneven termination point on the inner and outer surfaces of the cathode current collector, and
a cathode lead is connected to near a central end portion of the cathode current collector, and the cathode lead is disposed so as to avoid a region from a central angle of 30° from the central end portion of the inner cathode active material layer in a winding direction R to a central angle of 30° from the central end portion of the inner cathode active, material layer in a direction opposite to the winding direction at the center of the spirally wound body.

* * * * *